US012587906B2

(12) United States Patent
Watfa

(10) Patent No.: US 12,587,906 B2
(45) Date of Patent: *Mar. 24, 2026

(54) METHOD AND APPARATUS FOR MANAGING DATA SESSION IN WIRELESS COMMUNICATION SYSTEM

(71) Applicant: Samsung Electronics Co., Ltd., Suwon-si (KR)

(72) Inventor: Mahmoud Watfa, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 385 days.

This patent is subject to a terminal disclaimer.

(21) Appl. No.: 18/304,112

(22) Filed: Apr. 20, 2023

(65) Prior Publication Data

US 2023/0269629 A1     Aug. 24, 2023

Related U.S. Application Data

(63) Continuation of application No. 17/205,938, filed on Mar. 18, 2021, now Pat. No. 11,638,179.

(30) Foreign Application Priority Data

Mar. 23, 2020     (GB) ...................................... 2004210
Mar. 23, 2020     (GB) ...................................... 2004214

(51) Int. Cl.
*H04W 28/24*          (2009.01)
*H04W 8/18*           (2009.01)
          (Continued)

(52) U.S. Cl.
CPC ......... *H04W 28/24* (2013.01); *H04W 12/033* (2021.01); *H04W 12/10* (2013.01); *H04W 28/0268* (2013.01)

(58) Field of Classification Search
CPC ... H04W 28/24; H04W 12/033; H04W 12/10; H04W 28/0268
(Continued)

(56) References Cited

U.S. PATENT DOCUMENTS

2019/0116518 A1     4/2019     Stojanovski et al.
2019/0159157 A1     5/2019     Gupta
(Continued)

FOREIGN PATENT DOCUMENTS

CN          110876283 A          3/2020
CN          111163471 A          5/2020
(Continued)

OTHER PUBLICATIONS

Office Action dated Aug. 18, 2023, in connection with Korean Patent Application No. 10-2021-7022678, 7 pages.
(Continued)

*Primary Examiner* — Xuan Lu

(57)          ABSTRACT

A method performed by a user equipment (UE) in a wireless communication system is provided. The method may include: receiving, from a network entity, information associated with one or more quality of service (QoS) rules; checking the information associated with the one or more QoS rules, for a QoS rule associated with a non-default QoS rule and for the QoS rule with a rule operation different from deleting the QoS rule; in case that the UE is in a narrow band (NB)-N1 mode, the QoS rule is associated with the non-default QoS rule and the rule operation is different from deleting the QoS rule, detecting the QoS rule as an error; and transmitting, to the network entity, a protocol data unit (PDU) session modification request message to delete the detected QoS rule.

20 Claims, 7 Drawing Sheets

(51) Int. Cl.
   *H04W 12/033*     (2021.01)
   *H04W 12/10*      (2021.01)
   *H04W 28/02*      (2009.01)
   *H04W 76/22*      (2018.01)

(58) Field of Classification Search
   USPC ........................................................ 370/329
   See application file for complete search history.

(56)                References Cited

U.S. PATENT DOCUMENTS

| | | | |
|---|---|---|---|
| 2020/0008106 A1 | 1/2020 | Huang-Fu et al. | |
| 2020/0037165 A1 | 1/2020 | Kunz et al. | |
| 2020/0053596 A1 | 2/2020 | Huang-Fu et al. | |
| 2020/0322869 A1* | 10/2020 | Huang-Fu | H04W 76/22 |
| 2021/0329457 A1 | 10/2021 | Vutukuri et al. | |

FOREIGN PATENT DOCUMENTS

| | | | |
|---|---|---|---|
| CN | 113923269 A | 1/2022 | |
| EP | 3477993 A1 | 5/2019 | |
| EP | 3591999 A1 | 1/2020 | |
| WO | WO-2019095209 A1 * | 5/2019 | H04W 28/0257 |
| WO | 2019193147 A1 | 10/2019 | |
| WO | 2019196761 A1 | 10/2019 | |
| WO | 2019196821 A1 | 10/2019 | |
| WO | 2019197125 A1 | 10/2019 | |
| WO | 2020027632 A1 | 2/2020 | |
| WO | 2020030030 A1 | 2/2020 | |
| WO | 2020221688 A1 | 11/2020 | |

OTHER PUBLICATIONS

Office Action dated Oct. 20, 2023, in connection with Chinese Patent Application No. 202180002112.9, 16 pages.
Notice of Allowance dated Sep. 4, 2023, in connection with European Patent Application No. 21729396.8, 156 pages.
Notice of Allowance dated Nov. 8, 2023, in connection with European Patent Application No. 21729396.8, 153 pages.
Qualcomm Incorporated et al., "Handling multiple QoS errors during a PDU session modification procedure—Option 1," 3GPP TSG-CT WG1 Meeting #121, C1-199053, Reno (NV), USA, Nov. 11-15, 2019, 11 pages.
Notice of Allowance issued Apr. 30, 2024, in connection with Chinese Patent Application No. 202180002112.9, 7 pages.
Communication under Rule 71(3) EPC dated Nov. 14, 2024, in connection with European Patent Application No. 23214918.7, 60 pages.
3GPP TS 24.301 V16.3.0 (Dec. 2019) Technical Specification, 3rd Generation Partnership Project; Technical Specification Group Core Network and Terminals; Non-Access-Stratum (NAS) protocol for Evolved Packet System (EPS); Stage 3 (Release 16), Dec. 2019, 570 pages.
Supplementary European Search Report dated Feb. 20, 2024, in connection with European Patent Application No. 23214918.7, 7 pages.
Notice of Allowance issued Mar. 21, 2024, in connection with Korean Patent Application No. 10-2024-7003279, 16 pages.
Qualcomm Incorporated et al., "Enforcing maximum UP resources activation of 2 PDU sessions for NB-IoT," 3GPP TSG-SA WG2 Meeting #136, S2-1912425(revision of S2-191110), Nov. 2019, Reno, NV, 27 pages.
Huawei, "Introduction of NB-IoT related NG-AP procedures," 3GPP TSG-RAN WG3 #107-e, R3-200035, E-Meeting, Feb. 24-Mar. 6, 2020, 147 pages.

CT1, "CR pack on 5G_CIoT-2 ," CP-201096, 3GPP TSG-CT Meeting #88e, E-Meeting, Jun. 29-Jul. 1, 2020, 271 pages.
Ericsson et al., "Handling of maximum supported data rate per UE for integrity protection", Change Request, 3GPP TSG-SA WG2 Meeting #127-Bis, May 22, 2018, S2-184765, 22 pages.
Samsung et al., "Integrity protection data rate for UEs that don't support N3 data transfer", Change Request, 3GPP TSG-CT WG1 Meeting #123-e, Mar. 23, 2020, C1-202079, 2 pages.
Supplementary European Search Report dated May 18, 2022 in connection with European Patent Application No. 21 72 9396.8, 13 pages.
European Patent Office, "Supplementary Partial European Search Report" issued Feb. 9, 2022, in connection with European Patent Application No. 21729396.8, 12 pages.
Samsung, "Discussion on errors on QoS parameter operations in NB-IoT" 3GPP TSG CT WG1 Meeting #123-e, Electronic meeting, Apr. 16-24, 2020, C1-202387, 3 pages.
MediaTek Inc., et al, "UE handling of multiple QoS errors in EPS" 3GPP TSG-CT WG1 Meeting #121bis-e, C1ah-200167, Jan. 16-22, 2020, 11 pages.
The Intellectual Property Office of the United Kingdom, "Patents Act 1977: Search Report under Section 17" issued Aug. 24, 2020, in connection with Great Britain Patent Application No. 2004214.9, 1 pages.
United Kingdom Intellectual Property Office, "Examination Report" issued Jun. 30, 2022, in connection with GB Patent Application No. 2004214.9, 17 pages.
United Kingdom Intellectual Property Office, "Combined Search and Examination Report," issued Aug. 25, 2020, in connection with GB Patent Application No. 2004214.9, 7 pages.
3GPP TS 23.501 V16.3.0 (Dec. 2019) Technical Specification; 3rd Generation Partnership Project; Technical Specification Group Services and System Aspects; System architecture for the 5G System (5GS); Stage 2 (Release 16); 417 pages.
3GPP TS 24.501 V16.3.0 (Dec. 2019); Technical Specification; 3rd Generation Partnership Project (3GPP); Non-Access Stratum (NAS) procedures in the 5G system (5GS) used by the protocols for mobility management and session management between the UE; 644 pages.
Office Action dated Jan. 20, 2023, in connection with GB Patent Application No. 2215202.9, 7 pages.
Office Action dated Jan. 31, 2023, in connection with GB Patent Application No. 2300956.6, 5 pages.
Office Action dated Jan. 20, 2023, in connection with GB Patent Application No. 2215201.1, 8 pages.
3GPP TS 23.502 V16.3.0 (Dec. 2019) Technical Specification 3rd Generation Partnership Project; Technical Specification Group Services and System Aspects; Procedures for the 5G System (5GS); Stage 2 (Release 16), 284 pages.
International Search Report and Written Opinion of the International Searching Authority in connection with International Application No. PCT/KR2021/003012 issued Jun. 16, 2021, 9 pages.
Nokia et al., "Setting the Always-on PDU session indication IE in the PDU Session Establishment Accept message", 3GPP TSG-CT WG1 Meeting #122-e, C1-200962, Electronic meeting, Feb. 20-28, 2020, 9 pages.
Huawei et al., "UE-requested user-plane resources release in NB-N1 mode", 3GPP TSG-CT WG1 Meeting #122, C1-200996, Electronic meeting, Feb. 20-28, 2020, 13 pages.
Nokia et al.,"Setting the Always-on PDU session indication IE in the PDU Session Establishment Accept message", 3GPP TSG-CT WG1, Meeting #122-e, C1-200685, Electronic meeting, Feb. 20-28, 2020, 9 pages.
Qualcomm Incorporated, "Handling multiple QoS errors during a PDU session modification procedure", 3GPP TSG CT WG1 Meeting #121, C1-198121,Reno (NV), USA, Nov. 11-15, 2019, 6 pages.

* cited by examiner

FIG. 1

| 8 | 7 | 6 | 5 | 4 | 3 | 2 | 1 | |
|---|---|---|---|---|---|---|---|---|
| Integrity protection maximum data rate IEI | | | | | | | | octet 1 |
| Length of the integrity protection maximum data rate contents | | | | | | | | octet 2 |
| Maximum data rate per UE for user-plane Integrity protection for uplink | | | | | | | | octet 3 |
| Maximum data rate per UE for user-plane Integrity protection for downlink | | | | | | | | octet 4 |

FIG. 4

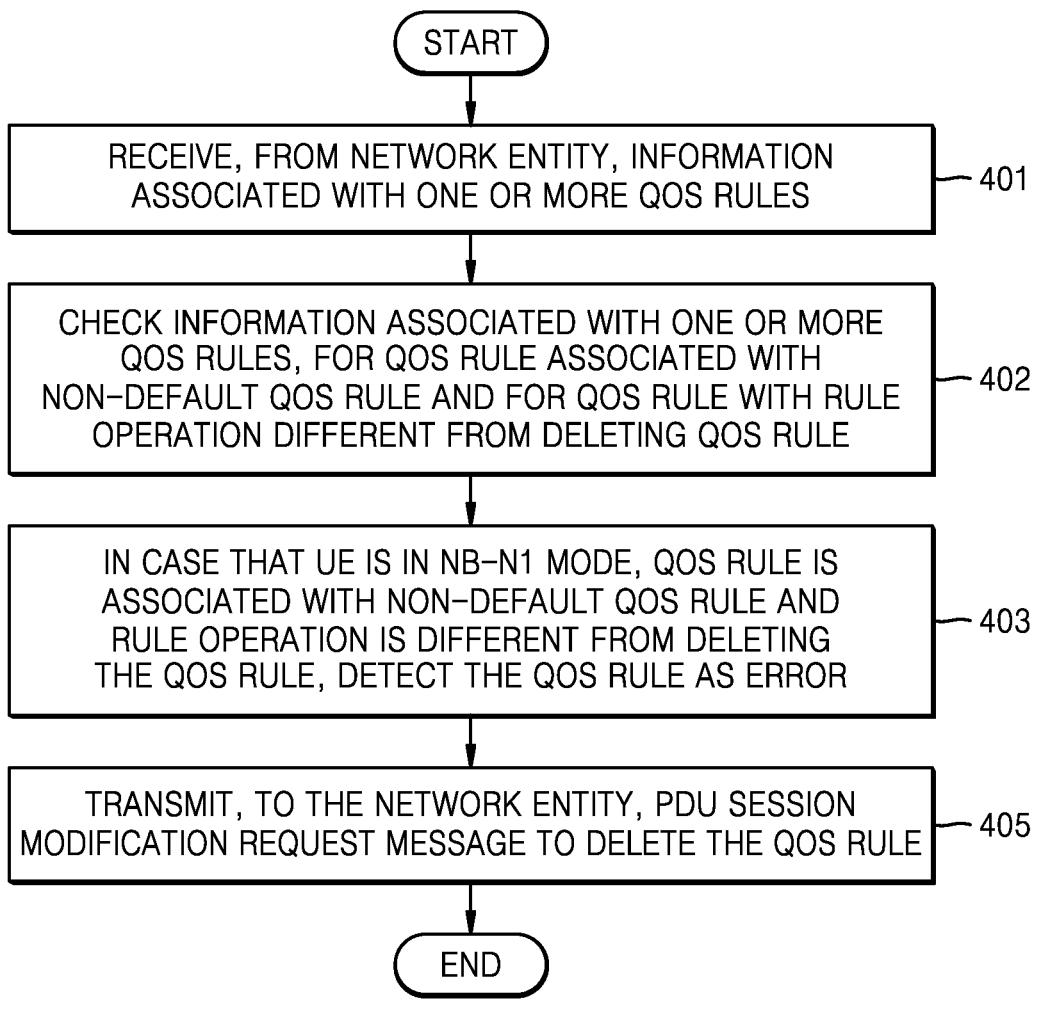

START

RECEIVE, FROM NETWORK ENTITY, INFORMATION ASSOCIATED WITH ONE OR MORE QOS RULES — 401

CHECK INFORMATION ASSOCIATED WITH ONE OR MORE QOS RULES, FOR QOS RULE ASSOCIATED WITH NON-DEFAULT QOS RULE AND FOR QOS RULE WITH RULE OPERATION DIFFERENT FROM DELETING QOS RULE — 402

IN CASE THAT UE IS IN NB-N1 MODE, QOS RULE IS ASSOCIATED WITH NON-DEFAULT QOS RULE AND RULE OPERATION IS DIFFERENT FROM DELETING THE QOS RULE, DETECT THE QOS RULE AS ERROR — 403

TRANSMIT, TO THE NETWORK ENTITY, PDU SESSION MODIFICATION REQUEST MESSAGE TO DELETE THE QOS RULE — 405

END

FIG. 5

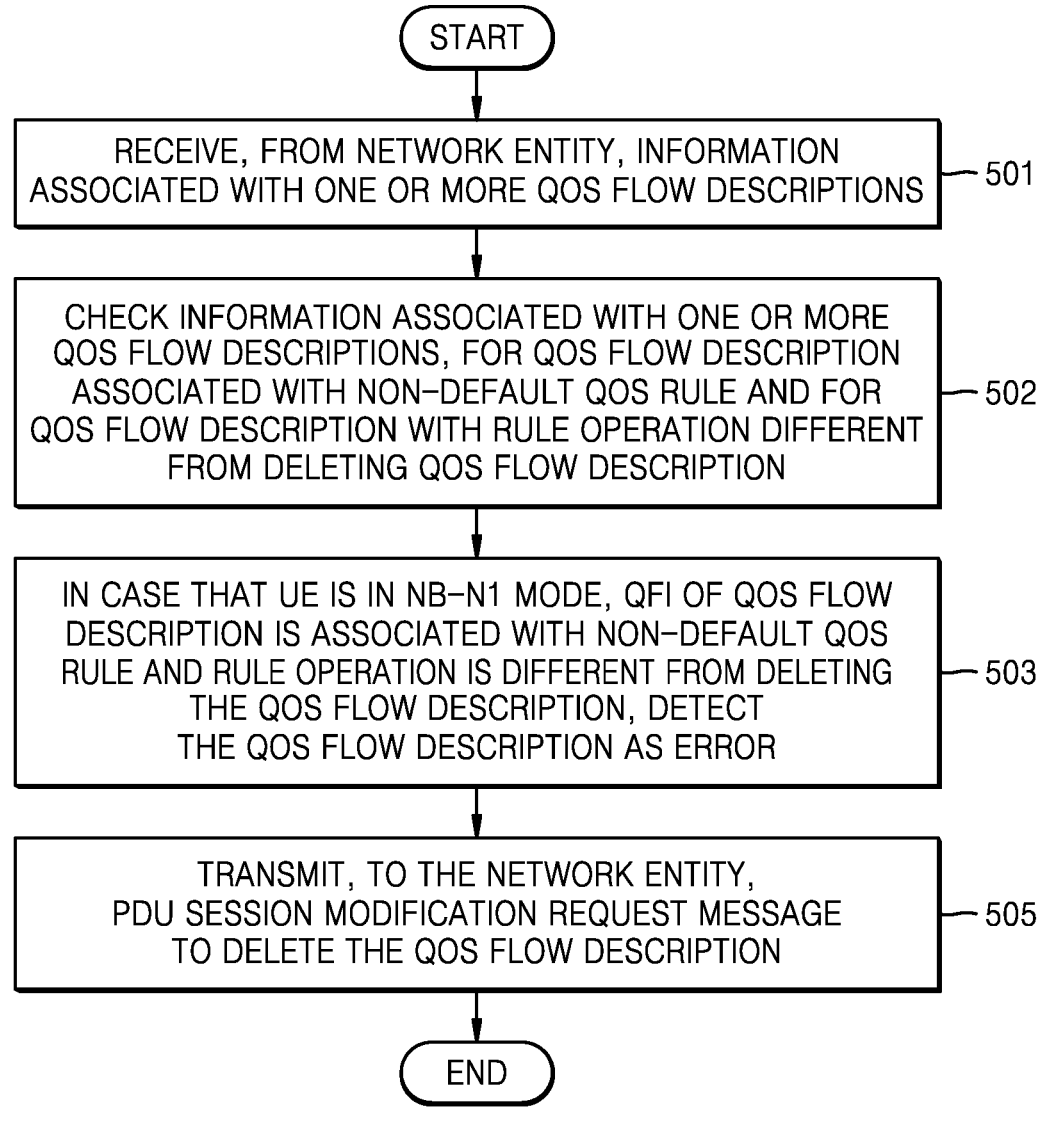

START

RECEIVE, FROM NETWORK ENTITY, INFORMATION
ASSOCIATED WITH ONE OR MORE QOS FLOW DESCRIPTIONS ── 501

CHECK INFORMATION ASSOCIATED WITH ONE OR MORE
QOS FLOW DESCRIPTIONS, FOR QOS FLOW DESCRIPTION
ASSOCIATED WITH NON-DEFAULT QOS RULE AND FOR
QOS FLOW DESCRIPTION WITH RULE OPERATION DIFFERENT
FROM DELETING QOS FLOW DESCRIPTION ── 502

IN CASE THAT UE IS IN NB-N1 MODE, QFI OF QOS FLOW
DESCRIPTION IS ASSOCIATED WITH NON-DEFAULT QOS
RULE AND RULE OPERATION IS DIFFERENT FROM DELETING
THE QOS FLOW DESCRIPTION, DETECT
THE QOS FLOW DESCRIPTION AS ERROR ── 503

TRANSMIT, TO THE NETWORK ENTITY,
PDU SESSION MODIFICATION REQUEST MESSAGE
TO DELETE THE QOS FLOW DESCRIPTION ── 505

END

METHOD AND APPARATUS FOR MANAGING DATA SESSION IN WIRELESS COMMUNICATION SYSTEM

CROSS-REFERENCE TO RELATED APPLICATIONS

This application is a continuation of application Ser. No. 17/205,938 filed Mar. 18, 2021, now U.S. Pat. No. 11,638, 179 issued Apr. 25, 2023, which is based on and claims priority under 35 U.S.C. § 119(a) to Great Britain Patent Application No. 2004210.7 filed on Mar. 23, 2020 and Great Britain Patent Application No. 2004214.9 filed on Mar. 23, 2020, the disclosures of which are herein incorporated by reference in their entirety.

BACKGROUND

1. Field

The disclosure relates to managing data sessions in a network. More particularly, the disclosure relates to managing Protocol Data Unit (PDU) sessions for Narrowband-Internet of Things (NB-IoT) in 3GPP 5G Session Management (5GSM).

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

SUMMARY

In accordance an embodiment of the disclosure, a method performed by a user equipment (UE) in a wireless communication system is provided. The method may comprise: receiving, from a network entity, information associated with one or more quality of service (QoS) rules; checking the information associated with the one or more QoS rules, for a QoS rule associated with a non-default QoS rule and for the QoS rule with a rule operation different from deleting the QoS rule; in case that the UE is in a narrow band (NB)-N1 mode, the QoS rule is associated with the non-default QoS rule and the rule operation is different from deleting the QoS rule, detecting the QoS rule as an error; and transmitting, to the network entity, a protocol data unit (PDU) session modification request message to delete the detected QoS rule.

In accordance an embodiment of the disclosure, a method performed by a user equipment (UE) in a wireless communication system is provided. The method may comprise: receiving, from a network entity, information associated with one or more quality of service (QoS) flow descriptions; checking the information associated with the one or more QoS flow descriptions, for a QoS flow description associated with a non-default QoS rule and for the QoS flow description with a rule operation different from deleting the QoS flow description; in case that the UE is in a narrow band (NB)-N1 mode, a QoS flow ID (QFI) of the QoS flow description is associated with the non-default QoS rule and the rule operation is different from deleting the QoS flow description, detecting the QoS flow description as an error; and transmitting, to the network entity, a protocol data unit (PDU) session modification request message to delete the detected QoS flow description.

In accordance an embodiment of the disclosure, a method performed by a user equipment (UE) in a wireless communication system is provided. The method may comprise: in case that N3 data transfer is not supported by the UE, identifying one or more values of an integrity protection maximum data rate information element as one or more values indicating that the N3 data transfer is not supported by the UE; and transmitting, to a network entity, information associated with the integrity protection maximum data rate information element.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1 illustrates an exemplary coding of an Integrity protection maximum data rate IE of type TLV;

FIG. 4 is a flowchart of a method performed by a user equipment according to another embodiment of the disclosure;

4

Figure 6:
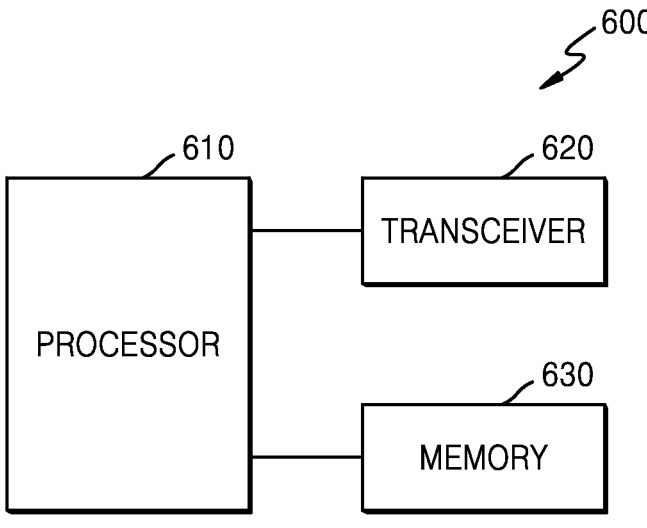
Figure 7:
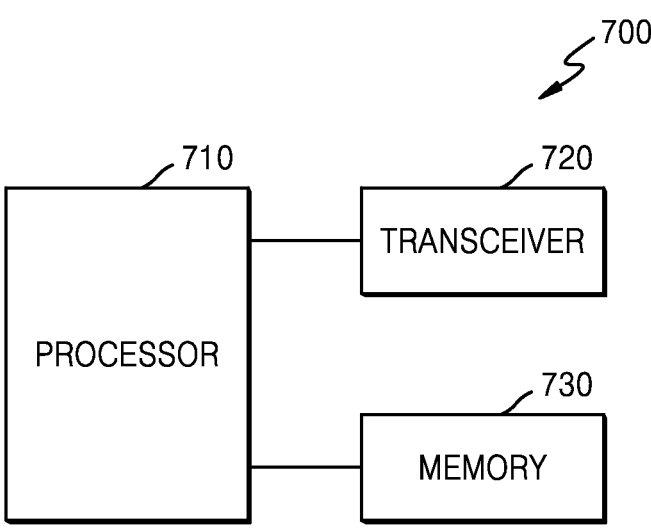

FIG. 5 is a flow chart of a method performed by a user equipment according to another embodiment of the disclosure;

FIG. 6 is a diagram illustrating a user equipment according to an embodiment of the disclosure: and FIG. 7 is a diagram illustrating a core network entity according to embodiments of the present disclosure.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Throughout the disclosure, the expression "at least one of a, b or c" indicates only a, only b, only c, both a and b, both a and c, both b and c, all of a, b, and c, or variations thereof. Throughout the specification, a layer (or a layer apparatus) may also be referred to as an entity. Hereinafter, operation principles of the disclosure will be described in detail with reference to accompanying drawings. In the following descriptions, well-known functions or configurations are not described in detail because they would obscure the disclosure with unnecessary details. The terms used in the specification are defined in consideration of functions used in the disclosure, and can be changed according to the intent or commonly used methods of users or operators. Accordingly, definitions of the terms are understood based on the entire descriptions of the present specification.

For the same reasons, in the drawings, some elements may be exaggerated, omitted, or roughly illustrated. Also, a size of each element does not exactly correspond to an actual size of each element. In each drawing, elements that are the same or are in correspondence are rendered the same reference numeral.

Advantages and features of the disclosure and methods of accomplishing the same may be understood more readily by reference to the following detailed descriptions of embodiments and accompanying drawings of the disclosure. The disclosure may, however, be embodied in many different forms and should not be construed as being limited to the embodiments set forth herein; rather, these embodiments of the disclosure are provided so that this disclosure will be thorough and complete, and will fully convey the concept of the disclosure to one of ordinary skill in the art. Therefore, the scope of the disclosure is defined by the appended claims. Throughout the specification, like reference numerals refer to like elements. It will be understood that blocks in flowcharts or combinations of the flowcharts may be performed by computer program instructions. Because these computer program instructions may be loaded into a processor of a general-purpose computer, a special-purpose computer, or another programmable data processing apparatus, the instructions, which are performed by a processor of a computer or another programmable data processing apparatus, create units for performing functions described in the flowchart block(s).

The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufactured items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It is also noted that, in some alternative implementations, functions mentioned in blocks may occur out of order. For example, two consecutive blocks may also be executed simultaneously or in reverse order depending on functions corresponding thereto.

As used herein, the term "unit" denotes a software element or a hardware element such as a field-programmable gate array (FPGA) or an application-specific integrated circuit (ASIC), and performs a certain function. However, the term "unit" is not limited to software or hardware. The "unit" may be formed so as to be in an addressable storage medium, or may be formed so as to operate one or more processors. Thus, for example, the term "unit" may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables.

Functions provided by the elements and "units" may be combined into the smaller number of elements and "units", or may be divided into additional elements and "units". Furthermore, the elements and "units" may be embodied to reproduce one or more central processing units (CPUs) in a device or security multimedia card. Also, in an embodiment of the disclosure, the "unit" may include at least one processor. In the following descriptions of the disclosure, well-known functions or configurations are not described in detail because they would obscure the disclosure with unnecessary details.

Hereinafter, for convenience of explanation, the disclosure uses terms and names defined in the 3rd generation partnership project long term evolution (3GPP LTE) standards. However, the disclosure is not limited to the terms and names, and may also be applied to systems following other standards.

In the disclosure, an evolved node B (eNB) may be interchangeably used with a next-generation node B (gNB) for convenience of explanation. That is, a base station (BS)

described by an eNB may represent a gNB. In the following descriptions, the term "base station" refers to an entity for allocating resources to a user equipment (UE) and may be used interchangeably with at least one of a gNode B, an eNode B, a node B, a base station (BS), a radio access unit, a base station controller (BSC), or a node over a network. The term "terminal" may be used interchangeably with a user equipment (UE), a mobile station (MS), a cellular phone, a smartphone, a computer, or a multimedia system capable of performing communication functions. However, the disclosure is not limited to the aforementioned examples. In particular, the disclosure is applicable to 3GPP new radio (NR) (or 5th generation (5G)) mobile communication standards. In the following description, the term eNB may be interchangeably used with the term gNB for convenience of explanation. That is, a base station explained as an eNB may also indicate a gNB. The term UE may also indicate a mobile phone, NB-IoT devices, sensors, and other wireless communication devices.

Herein, the following documents are referenced:
[1] 3GPP TS 23.501 V16.3.0
[2] 3GPP TS 24.501 V16.3.0
[3] 3GPP TS 23.502 V16.3.0
[4] 3GPP TS 24.301 V16.3.0

Various acronyms and abbreviations used herein are defined at the end of this description.

The above documents disclose various operations and procedures, including the following.

Overview of the Integrity protection maximum data rate IE in the PDU Session Establishment Request Message 5GS enables the application of integrity protection to the UP of a PDU session as described in TS 23.501 [1]:

The SMF determines at PDU session establishment a User Plane Security Enforcement information for the user plane of a PDU session based on:

subscribed User Plane Security Policy which is part of SM subscription information received from UDM; and User Plane Security Policy locally configured per (DNN, S-NSSAI) in the SMF that is used when the UDM does not provide User Plane Security Policy information.

The maximum supported data rate per UE for integrity protection for the DRBs, provided by the UE in the Integrity protection maximum data rate IE during PDU Session Establishment.

As per the above, the UE is required to provide the Integrity protection maximum data rate IE in the PDU Session Establishment Request message as specified in TS 24.501 [2] i.e. this IE is a mandatory IE in the PDU Session Establishment Request as shown below, highlighted in bold and underline:

TABLE 1

PDU SESSION ESTABLISHMENT REQUEST message content
(corresponds to Table 8.3.1.1.1 from [2])

| IEI | Information Element | Type/Reference | Presence | Format | Length |
|---|---|---|---|---|---|
| | Extended protocol discriminator | Extended protocol discriminator 9.2 | M | V | 1 |
| | PDU session ID | PDU session identity 9.4 | M | V | 1 |
| | PTI | Procedure transaction identity 9.6 | M | V | 1 |
| | PDU SESSION ESTABLISHMENT REQUEST message identity | Message type 9.7 | M | V | 1 |
| | Integrity protection maximum data rate | Integrity protection maximum data rate 9.11.4.7 | M | V | 2 |

TABLE 1-continued

| | PDU SESSION ESTABLISHMENT REQUEST message content (corresponds to Table 8.3.1.1.1 from [2]) | | | | |
|---|---|---|---|---|---|
| IEI | Information Element | Type/Reference | Presence | Format | Length |
| 9- | PDU session type | PDU session type 9.11.4.11 | O | TV | 1 |
| A- | SSC mode | SSC mode 9.11.4.16 | O | TV | 1 |
| 28 | 5GSM capability | 5GSM capability 9.11.4.1 | O | TLV | 3-15 |
| 55 | Maximum number of supported packet filters | Maximum number of supported packet filters 9.11.4.9 | O | TV | 3 |
| B- | Always-on PDU session requested | Always-on PDU session requested 9.11.4.4 | O | TV | 1 |
| 39 | SM PDU DN request container | SM PDU DN request container 9.11.4.15 | O | TLV | 3-255 |
| 7B | Extended protocol configuration options | Extended protocol configuration options 9.11.4.6 | O | TLV-E | 4-65538 |
| 66 | Header compression configuration | Header compression configuration 9.11.4.24 | O | TLV | 5-257 |
| 6EXX | DS-TT Ethernet port MAC address | DS-TT Ethernet port MAC address 9.11.4.25 | O | TLV | 8 |
| 6FYY | UE-DS-TT residence time | UE-DS-TT residence time 9.11.4.26 | O | TLV | 10 |
| 7C | Port management information container | Port management information container 9.11.4.27 | O | TLV-E | 4-65538 |

The support of data transfer over the user plane may also be referred to as N3 data transfer, as indicated by the "N3 data" bit of the 5GMM capability IE that is defined in [2]. As such, the term "N3 data transfer" may also mean the transfer of data over the user plane.

Handling of PDU sessions during idle mode inter-RAT mobility to/from NB-IoT

The NB-IoT RAT is deployed such that the TAIs do not overlap with those in WB-EUTRA or NRas described in [1]:

Tracking Areas are configured so that they do not contain both NB-IoT and other RATs cells, so when the UE is changing RAT type to or from NB-IoT while remaining registered with 5GC, the UE will perform the Mobility Registration Update procedure, see clause 5.3.2.3. When the UE is changing RAT type to or from NB-IoT and moving between 5GC and EPC, during the Registration, Attach or TAU procedure the RAT type change is determined.

PDU session handling is controlled by "PDU Session continuity at inter RAT mobility" in the UEs subscription data, which indicates per DNN/S-NSSAI whether to;

maintain the PDU session, disconnect the PDU session with a reactivation request, disconnect the PDU session without reactivation request, or leave it up to local VPLMN policy when the UE moves between a "broadband" RAT (e.g. NR or WB-E-UTRAN) and a "narrowband" RAT (NB-IoT).

During PDU session establishment the SMF retrieves the "PDU Session continuity at inter RAT mobility" subscription information (if available) from the UDM. Local SMF configuration is used if "PDU Session continuity at inter RAT mobility" is not available for a PDU Session.

The AMF informs the SMF at an inter-RAT idle mobility event, e.g. to or from NB-IoT connected to 5GC about the RAT type change in the Nsmf_PDUSession_UpdateSM-Context message during the Registration procedure. Based on this (H-)SMF handles the PDU session according to "PDU session continuity at inter RAT mobility information" subscription data or based on local policy.

NOTE: The "PDU Session continuity at inter RAT mobility" and "PDN continuity at inter-RAT mobility" subscription should be the same so that the PDU sessions/PDN connections are handled the same by both CN types.

During inter-RAT idle mode mobility to NB-IoT, if a PDU session has more than one QoS rule, the SMF shall initiate a PDU session modification procedure as described in TS 23.502 [3] to remove any non-default QoS rule, and maintain only the default QoS rule.

As also indicated above, when the UE moves into an NB-IoT coverage or RAT, for which the TAIs are non-overlapping with other RATs, the SMF determines whether or to keep the session based on the "PDU Session continuity at inter RAT mobility" in the UEs subscription data and/or local policies. If the session is kept for an NB-IoT device (also known as UE in NB-N1 mode), the SMF "shall initiate a PDU session modification procedure as described in TS 23.502 [3] to remove any non-default QoS rule, and maintain only the default QoS rule".

In general, during a PDU session modification procedure, the UE checks for errors in QoS rules. For example, since a PDU session must always have a default QoS rule, then the delete operation on the default QoS rule should not be permitted. Accordingly, the UE will release the PDU session if such an error occurs as described below from section 6.3.2.4 in [2]:

[ . . . SKIP . . . ]

If the PDU SESSION MODIFICATION COMMAND message includes the Authorized QoS rules IE, the UE shall process the QoS rules sequentially starting with the first QoS rule. The UE shall check the QoS rule and the QoS flow description provided in the PDU SESSION MODIFICATION COMMAND message for different types of errors as follows:

NOTE 4: If an error is detected in a QoS rule or a QoS flow description which requires rejecting the PDU SESSION MODIFICATION COMMAND message, then the Authorized QoS rules IE, the Authorized QoS flow descriptions IE and the Mapped EPS bearer contexts IE included in the PDU SESSION MODIFICA-TION COMMAND message are discarded, if any.

Semantic errors in QoS operations:

When the rule operation is "Modify existing QoS rule and add packet filters", "Modify existing QoS rule and replace all packet filters", "Modify existing QoS rule and delete packet filters" or "Modify existing QoS rule without modifying packet filters" on the default QoS rule and the DQR bit is set to "the QoS rule is not the default QoS rule".

When the rule operation is "Modify existing QoS rule and add packet filters", "Modify existing QoS rule and replace all packet filters", "Modify existing QoS rule and delete packet filters" or "Modify existing QoS rule without modifying packet filters" on a QoS rule which is not the default QoS rule and the DQR bit is set to "the QoS rule is the default QoS rule".

When the rule operation is "Create new QoS rule" and the DQR bit is set to "the QoS rule is the default QoS rule" when there's already a default QoS rule with different QoS rule identifier.

When the rule operation is "Delete existing QoS rule" on the default QoS rule.

When the rule operation is "Create new QoS rule", "Modify existing QoS rule and add packet filters", "Modify existing QoS rule and replace all packet filters", "Modify existing QoS rule and delete packet filters", or "Modify existing QoS rule without modifying packet filters" and two or more QoS rules associated with this PDU session would have identical precedence values.

When the rule operation is "Modify existing QoS rule and delete packet filters", the QoS rule is a QoS rule of a PDU session of IPv4, IPv6, IPv4v6 or Ethernet PDU session type, and the packet filter list in the resultant QoS rule is empty.

When the rule operation is "Create new QoS rule" and there is already an existing QoS rule with the same QoS rule identifier.

When the rule operation is "Modify existing QoS rule and add packet filters", "Modify existing QoS rule and replace all packet filters", "Modify existing QoS rule and delete packet filters" or "Modify existing QoS rule without modifying packet filters" and the associated QoS rule does not exist.

When the rule operation is "Delete existing QoS rule" and there is no existing QoS rule with the same QoS rule identifier.

When the flow description operation is "Create new QoS flow description" and there is already an existing QoS flow description with the same QoS flow identifier.

When the flow description operation is "Modify existing QoS flow description" and the associated QoS flow description does not exist.

When the flow description operation is "Delete existing QoS flow description" and there is no existing QoS flow description with the same QoS flow identifier.

In case 4, the UE shall initiate a PDU session release procedure by sending a PDU SESSION RELEASE REQUEST message with 5GSM cause #83 "semantic error in the QoS operation".

In case 5, if the old QoS rule (i.e. the QoS rule that existed before the PDU SESSION MODIFICATION COMMAND message was received) is not the default QoS rule, the UE shall not diagnose an error, shall further process the new request and, if it was processed successfully, shall delete the old QoS rule which has identical precedence value. Furthermore, after sending the PDU SESSION MODIFICATION COMPLETE for the ongoing PDU session modification procedure, the UE shall send a PDU SESSION MODIFI-CATION REQUEST message with 5GSM cause #83 "semantic error in the QoS operation" to delete the QoS rule.

In case 5, if the old QoS rule (i.e. the QoS rule that existed before the PDU SESSION MODIFICATION COMMAND message was received) is the default QoS rule, the UE shall initiate a PDU session release procedure by sending a PDU SESSION RELEASE REQUEST message with 5GSM cause #83 "semantic error in the QoS operation".

In case 6, if the QoS rule is not the default QoS rule, after sending the PDU SESSION MODIFICATION COMPLETE for the ongoing PDU session modification procedure, the UE shall send a PDU SESSION MODIFICATION REQUEST message with 5GSM cause #83 "semantic error in the QoS operation" to delete the QoS rule.

In case 6, if the QoS rule is the default QoS rule, the UE shall initiate a PDU session release procedure by sending a PDU SESSION RELEASE REQUEST message with 5GSM cause #83 "semantic error in the QoS operation".

In case 7, if the existing QoS rule is not the default QoS rule and the DQR bit of the new QoS rule is set to "the QoS rule is not the default QoS rule", the UE shall not diagnose an error, further process the create request and, if it was processed successfully, delete the old QoS rule. If the existing QoS rule is the default QoS rule or the DQR bit of the new QoS rule is set to "the QoS rule is the default QoS rule", the UE shall reject the PDU SESSION MODIFICA-TION COMMAND message with 5GSM cause #83 "semantic error in the QoS operation".

In case 9, the UE shall not diagnose an error, further process the delete request and, if it was processed successfully, consider the respective QoS rule as successfully deleted.

In case 10, the UE shall not diagnose an error, further process the create request and, if it was processed successfully, delete the old QoS flow description.

In case 12, the UE shall not diagnose an error, further process the delete request and, if it was processed successfully, consider the respective QoS flow description as successfully deleted. Otherwise, the UE shall reject the PDU SESSION MODIFICATION COMMAND message with 5GSM cause #83 "semantic error in the QoS operation".

[ . . . SKIP . . . ]

The excerpt above shows that the delete operation on the default QoS rule (case 4 above) will lead to the release of the PDU session i.e. the UE will send the PDU Session Release Request message.

Another error that can occur is that shown in case 3 above, i.e. when there is a create operation and the QoS rule is indicated to be a default QoS rule (i.e. the DQR bit is set to "the QoS rule is the default QoS rule") and the UE already has a default QoS rule. In this case, the UE will reject the PDU SESSION MODIFICATION COMMAND message with 5GSM cause #83 "semantic error in the QoS operation".

It is an aim of the disclosure to address, solve and/or mitigate, at least partly, at least one of the problems and/or disadvantages associated with the related art, for example at least one of the problems and/or disadvantages described herein. It is an aim of the disclosure to provide at least one advantage over the related art, for example at least one of the advantages described herein.

The disclosure is defined in the independent claims. Advantageous features are defined in the dependent claims.

Other aspects, advantages, and salient features will become apparent to those skilled in the art from the following detailed description, taken in conjunction with the annexed drawings, which disclose examples of the disclosure.

The following description of examples of the present disclosure, with reference to the accompanying drawings, is provided to assist in a comprehensive understanding of the present disclosure, as defined by the claims. The description includes various specific details to assist in that understanding but these are to be regarded as merely exemplary. Accordingly, those of ordinary skill in the art will recognize that various changes and modifications of the examples described herein can be made without departing from the scope of the disclosure.

The same or similar components may be designated by the same or similar reference numerals, although they may be illustrated in different drawings.

Detailed descriptions of techniques, structures, constructions, functions or processes known in the art may be omitted for clarity and conciseness, and to avoid obscuring the subject matter of the present disclosure.

The terms and words used herein are not limited to the bibliographical or standard meanings, but, are merely used to enable a clear and consistent understanding of the disclosure.

Throughout the description and claims of this specification, the words "comprise", "include" and "contain" and variations of the words, for example "comprising" and "comprises", means "including but not limited to", and is not intended to (and does not) exclude other features, elements, components, integers, steps, processes, operations, functions, characteristics, properties and/or groups thereof.

Throughout the description and claims of this specification, the singular form, for example "a", "an" and "the", encompasses the plural unless the context otherwise requires. For example, reference to "an object" includes reference to one or more of such objects.

Throughout the description and claims of this specification, language in the general form of "X for Y" (where Y is some action, process, operation, function, activity or step and X is some means for carrying out that action, process, operation, function, activity or step) encompasses means X adapted, configured or arranged specifically, but not necessarily exclusively, to do Y.

Features, elements, components, integers, steps, processes, operations, functions, characteristics, properties and/or groups thereof described or disclosed in conjunction with a particular aspect, embodiment, example or claim of the present disclosure are to be understood to be applicable to any other aspect, embodiment, example or claim described herein unless incompatible therewith.

Certain examples of the present disclosure provide methods, apparatus and systems for managing data sessions in a network. For example, certain examples of the present disclosure provide methods, apparatus and systems for managing PDU sessions for NB-IoT in 3GPP 5GSM. However, the skilled person will appreciate that the present disclosure is not limited to these examples, and may be applied in any suitable system or standard, for example one or more existing and/or future generation wireless communication systems or standards.

The following examples are applicable to, and use terminology associated with, 3GPP 5G. However, the skilled person will appreciate that the techniques disclosed herein are not limited to 3GPP 5G. For example, the functionality of the various network entities and messages disclosed herein may be applied to corresponding or equivalent entities and messages in other communication systems or standards. Corresponding or equivalent entities and messages may be regarded as entities and messages that perform the same or similar role within the network. The skilled person will also appreciate that the transmission of information between network entities is not limited to the specific form, type or order of messages described in relation to the examples disclosed herein.

A particular network entity may be implemented as a network element on a dedicated hardware, as a software instance running on a dedicated hardware, and/or as a virtualised function instantiated on an appropriate platform, e.g. on a cloud infrastructure.

The skilled person will appreciate that the present disclosure is not limited to the specific examples disclosed herein. For example:

The techniques disclosed herein are not limited to 3GPP 5G.

One or more entities in the examples disclosed herein may be replaced with one or more alternative entities performing equivalent or corresponding functions, processes or operations.

One or more of the messages in the examples disclosed herein may be replaced with one or more alternative messages, signals or other type of information carriers that communicate equivalent or corresponding information.

One or more further elements or entities may be added to the examples disclosed herein.

One or more non-essential elements or entities may be omitted in certain examples.

The functions, processes or operations of a particular entity in one example may be divided between two or more separate entities in an alternative example.

The functions, processes or operations of two or more separate entities in one example may be performed by a single entity in an alternative example.

Information carried by a particular message in one example may be carried by two or more separate messages in an alternative example.

Information carried by two or more separate messages in one example may be carried by a single message in an alternative example.

The order in which operations are performed and/or the order in which messages are transmitted may be modified, if possible, in alternative examples.

Certain examples of the present disclosure may be provided in the form of an apparatus/device/network entity configured to perform one or more defined network functions and/or a method therefor. Certain examples of the present disclosure may be provided in the form of a system comprising one or more such apparatuses/devices/network entities, and/or a method therefor.

In the techniques of the related art, for example those referred to above, there occur the following problems.

A problem that the Integrity protection maximum data rate IE is applicable to the user plane but not all NB-IoT devices support data over the user plane may occur.

NB-IoT UEs are mandatorily required to support data transfer over the control plane. However, support for data transfer over the user plane is optional for these UEs.

Even when an NB-IoT device does not support data transfer over the user plane, the current format of the PDU Session Establishment Request message mandates that the UE indicates the supported data rate for which integrity protection can be applied on the user plane.

This creates ambiguity in the 5GSM protocol as the UE is mandated to provide information for a feature that it does not actually support. Moreover, such UEs will be forced to send two additional octets (as the IE is currently 2 octets long) which unnecessarily increases the NAS message size. This renders it inefficient for NB-IoT devices that are in low coverage areas, for which the RAN may configure the UE to repeat radio transmissions several times due to the use of coverage enhancement (i.e. when the UE is in a bad coverage). The unnecessary presence of two octets at the NAS can actually lead to multiple lower layer transmissions if the coverage level is very bad, especially when the entire NAS message cannot fit into one lower layer message for transmission. The additional two octets at the NAS can actually lead to segmentation of the NAS message into two parts depending on the transport block size that the UE is provided with.

A solution is thus needed to avoid a situation in which an NB-IoT UE sends information related to the user plane when the UE does not actually support data transfer over the user plane.

Errors associated with the PDU session modification procedure to delete all non-default QoS rules after mobility into NB-IoT RAT may be another problem.

As described earlier, when the UE enters NB-IoT RAT or coverage and the SMF decides to maintain an established PDU session for the UE, the SMF performs a PDU session modification procedure to delete all the QoS rules that are not a default QoS rule but will keep the default rule only. This means that if the UE has three PDU sessions, as an example, then for each session there is a need to perform a PDU session modification procedure. If the UE is in a bad coverage, the UE and/or the RAN may need to retransmit the 5GSM message a few times as configured by the RAN, and this increases overall signalling and power consumption at the UE.

Moreover, if the UE detects certain errors in the QoS rules when the SMF sends the 5GSM message, e.g. if the deleted QoS rule is a default QoS rule, then the UE will release the PDU session thereby causing more signalling to be exchanged and that is not power efficient for NB-IoT devices. This will in turn lead to more signalling to re-establish the PDU session again.

Additionally, as the UE in NB-IoT cannot have any non-default QoS rule, then if the UE receives the PDU Session Modification Command message with a QoS rule operation that is the create operation, i.e. to create a new QoS rule, then this should be considered as an error even if the create operation itself is not problematic. In this case, the operation on QoS rule should not be anything other than a delete operation for the non-default QoS rules. The UE is currently not required to check for such errors which are typically not considered as an error from a 5GSM protocol point of view. But since the UE is in NB-IoT, the UE will need to apply different checks to these rules.

Such problems are not yet solved.

Errors associated with a PDU session establishment procedure for a UE in NB-IoT RAT may be another problem.

As described earlier, the UE in NB-IoT RAT can only have a default QoS rule that is associated with a PDU session. As errors can occur during the PDU session establishment procedure, it is possible that the PDU Session Establishment Request message can have multiple QoS rules with the create operation. However, since only one QoS rule can be available (and that is the default QoS rule) then any additional QoS rule with a create operation should be considered an error. The UE behaviour in this case is not yet specified but should be.

Certain examples of the present disclosure address the above problems, for example by providing one or more of the techniques described below.

In certain examples of the present disclosure, a UE which does not support transfer of data over the user plane should not send any information about the integrity protection of the user plane. Hence the corresponding field in the PDU Session Establishment Request message and in the PDU Session Modification Request message should be optional and should only be sent by UEs that support the transfer of data via the user plane (also known as N3 data transfer).

Certain examples of the present disclosure provide an efficient technique to not use the non-default QoS rules when in NB-IoT RAT, by either performing a local delete of these rules or by saving them for subsequent use after mobility out of NB-IoT. Alternatively, if required to be deleted explicitly, in certain examples of the present disclosure the UE may verify the possibility of errors in QoS operations and apply a technique to recover from such errors.

Certain examples of the present disclosure will now be described in more detail.

In an embodiment, handling of the Integrity protection maximum data rate IE in the PDU Session Establishment Request message may be provided.

As indicated above, the NB-IoT UE may not support data transfer over the user plane. Therefore, it is not necessary that the UE indicates the integrity protection rate for the user plane that is anyways not supported. Various examples of the present disclosure provide a number of solution options to address this problem.

Solution Option 1

In certain examples of the present disclosure, the Integrity protection maximum data rate IE should be an optional IE or a conditional IE in the PDU Session Establishment Request message.

The UE, optionally an NB-IoT UE, that does not support N3 data transfer (or transfer of data over the user plane) may not send the Integrity protection maximum data rate IE in the PDU Session Establishment Request message. Otherwise, the UE supporting N3 data transfer may send the IE in the PDU Session Establishment Request message.

This solution requires that the Integrity protection maximum data rate IE become an optional IE, for example as indicated in Table 2 below:

TABLE 2

| | PDU SESSION ESTABLISHMENT REQUEST message content with the Integrity protection maximum data rate IE as optional | | | | |
|---|---|---|---|---|---|
| IEI | Information Element | Type/Reference | Presence | Format | Length |
| | Extended protocol discriminator | Extended protocol discriminator 9.2 | M | V | 1 |
| | PDU session ID | PDU session identity 9.4 | M | V | 1 |
| | PTI | Procedure transaction identity 9.6 | M | V | 1 |
| | PDU SESSION ESTABLISHMENT REQUEST message identity | Message type 9.7 | M | V | 1 |
| ZZ (e.g. 7A, or 7D) | Integrity protection maximum data rate | Integrity protection maximum data rate 9.11.4.7 | O or C | TLV or TV | 4 or 3 |
| 9- | PDU session type | PDU session type 9.11.4.11 | O | TV | 1 |
| A- | SSC mode | SSC mode 9.11.4.16 | O | TV | 1 |
| 28 | 5GSM capability | 5GSM capability 9.11.4.1 | O | TLV | 3-15 |
| 55 | Maximum number of supported packet filters | Maximum number of supported packet filters 9.11.4.9 | O | TV | 3 |
| B- | Always-on PDU session requested | Always-on PDU session requested 9.11.4.4 | O | TV | 1 |
| 39 | SM PDU DN request container | SM PDU DN request container 9.11.4.15 | O | TLV | 3-255 |
| 7B | Extended protocol configuration options | Extended protocol configuration options 9.11.4.6 | O | TLV-E | 4-65538 |
| 66 | Header compression configuration | Header compression configuration 9.11.4.24 | O | TLV | 5-257 |
| 6EXX | DS-TT Ethernet port MAC address | DS-TT Ethernet port MAC address 9.11.4.25 | O | TLV | 8 |
| 6FYY | UE-DS-TT residence time | UE-DS-TT residence time 9.11.4.26 | O | TLV | 10 |
| 7C | Port management information container | Port management information container 9.11.4.27 | O | TLV-E | 4-65538 |

FIG. 1 illustrates an exemplary coding of an Integrity protection maximum data rate IE of type TLV.

In certain examples, if the Integrity protection maximum data rate LE is defined to be of type TLV(type length value), then the IE should be coded as shown in FIG. 1.

In certain examples, the Integrity protection maximum data rate LE should only be sent in the PDU Session Modification Request message for a PDN (packet data network) connection established when in S1 mode, after the first inter-system change from S1 mode to N1 mode, the UE is operating in single-registration mode in the network supporting N26 interface, and if the UE supports data transfer over the user plane (i.e. the UE supports N3 data transfer).

In certain examples, the UE which does not support N3 data transfer may indicate the same to the network so that the SMF is aware that the Integrity protection maximum data rate field is not sent in the 5GSM message.

For example, the indication that the UE can provide may be in one or more of the following ways:

The UE may include the indication in the ULNAS TRANSPORT message which carries the 5GSM message. The indication may be in the form of a new IE where the new IE may be of type TV or TLV, or T, or any other type. The IE may have a value component, optionally in the form of bit positions, where a specific value may be defined for the value component to indicate that N3 data transfer is not supported by the UE. The UE may optionally include this indication when sending every 5GSM message.

An existing IE or field in the UL NAS TRANSPORT message may be used for this purpose as described above. For example, the existing Request type IE in the UL NAS TRANSPORT message can be used for this purpose. For example, the reserved value "11" can be used to mean "initial request without N3 data transfer" where the value indicates that the request is a new request (i.e. to establish a new PDU session) while also indicating that the UE does not support N3 data transfer.

A new 5GSM message identity, i.e. a new 5GSM message (e.g. a PDU Session Establishment Request for Control Plane Data) may be defined and used. Hence the UE that does not support N3 data transfer may use the new 5GSM message (as described herein) to establish a PDU session. This message will not contain the Integrity protection maximum data rate IE and the 5GSM message will be like the message shown in Table 2 but without the Integrity protection maximum data rate IE.

The AMF may determine that the UE does not support (or does support) N3 data transfer based on the "N3 data" bit (e.g. bit 6 of octet 3) in the 5GMM capability IE. For such UEs, when the AMF receives an UL NAS TRANSPORT with a new indication that N3 data transfer is not supported (as described above), the AMF may in turn forward this indication to the SMF over the N11 (or Nsmf) reference point (see 3GPP TS 23.501). Note that the indication on the N11 (or Nsmf) reference point may be in the form of a new value for an existing parameter or may be introduced as a new parameter. Regardless, the indication informs the SMF that N3 data transfer is not supported by the UE.

When the SMF receives an indication from the AMF (e.g. over the N11 (or Nsmf) reference point or using a new parameter or a new value for an existing parameter) that the UE does not support N3 data transfer, the SMF determines that the PDU Session Establishment Request message does not include the Integrity protection maximum data rate field and would therefore expect the 5GSM message to be like the one shown in Table 2 but without the Integrity protection maximum data rate IE.

Solution Option 2

In certain examples of the present disclosure, the UE may send Integrity protection maximum data rate IE optionally as a mandatory IE but set the value to a specific value.

In this solution option, the IE is optionally kept as a mandatory IE but a reserved or specific value is defined to be used by a UE, optionally an NB-IoT UE, that does not support N3 data transfer. As an example, the value "011111111" can be used for such UEs that don't support N3 data transfer and as such these UEs will set the value component of the IE to this specific value. The value "011111111" may be interpreted as, "NULL", or "user-plane integrity protection is not supported", or "user-plane integrity protection is not supported for uplink", or "user-plane integrity protection is not supported for downlink", where based on the direction being referred to the particular interpretation can apply. The skilled person will appreciate that this value i.e. "011111111" is to be taken as an example and that any other suitable value can be defined for this purpose. Moreover, the skilled person will appreciate that the interpretations provided above are to be taken as examples and that other interpretations can be defined instead e.g. "control plane only device", etc.

When the SMF receives this IE in the 5GSM message with a specific value as described above, the SMF determines that user plane integrity protection is not supported for this UE and may set the integrity protection requirement as not needed.

As another alternative of this option, the UE may set the IE to any value.

In certain examples, with any of the alternatives above, when the SMF receives a PDU Session Establishment Request message, that is forwarded by the AMF, and also receives the Control plane only indication from the AMF, or any of the other indications described herein, then based on the received indication (e.g. the Control plane only indication), the SMF determines that the integrity protection for the user plane associated with this PDU session is not required. The SMF can then ignore these received values.

In an embodiment, handling of QoS rules after inter-RAT mobility into an NB-IoT RAT may be provided.

Solution Option 1

In order to reduce signaling for NB-IoT, in certain examples, upon mobility into NB-IoT RAT, the UE and the SMF may locally delete all the QoS rules that are not the default QoS rules and maintain only the default QoS rule.

This will avoid the need to initiate a PDU session modification procedure as is currently done. Moreover, the UE and the SMF may optionally set the packet filter that is associated with the default QoS rule to a match all filter for the uplink and optionally for downlink direction such that all the traffic associated with this PDU session will be mapped or matched to the default QoS rule.

In an alternative example, the UE may verify for additional errors that are associated with the PDU Session Modification Command message for this particular case of being in NB-IoT RAT. Since the UE in NB-IoT can only have one QoS rule and that should be the default QoS rule, then the 5GSM message should only contain QoS rules with delete operations so that all the non-default QoS rules (i.e. all the QoS rules that are not the default QoS rule) will be deleted as required. To ensure this is the case, in certain examples the UE may perform the following checks while in NB-IoT and the PDU Session Modification Command message is received.

In an embodiment, the UE may check if there is a QoS rule with the rule operation set to:

"Create new QoS rule" and optionally the DQR bit is not set to "the QoS rule is not the default QoS rule", "Modify existing QoS rule and add packet filters", "Modify existing QoS rule and replace all packet filters", "Modify existing QoS rule and delete packet filters" or "Modify existing QoS rule without modifying packet filters" and optionally the operation is on the non-default QoS rules.

Alternatively, in an embodiment, the UE for each non-default QoS rule, the UE may check if the operation is different from "Delete existing QoS rule". If so, the UE may determine that the QoS rule is erroneous and proceed as described herein. Note that this is just another way to achieve the check that is proposed above.

If the above occurs, the UE may, after the completion of the current PDU session modification procedure, send a PDU Session Modification Request message to delete each of the QoS rule that is not the default QoS rule.

Alternatively, the UE does not diagnose an error and shall locally delete each QoS rule which is not the default QoS rule.

Alternatively, the UE shall initiate the PDU session release procedure (optionally after the completion of the ongoing PDU session modification procedure) by sending the PDU Session Release Request message.

Alternatively, the UE shall reject the PDU session modification procedure (i.e. the UE rejects PDU Session Modification Command message) by sending the PDU Session Modification Command Reject message.

In an embodiment, the UE may check if there is a QoS flow description with the flow description operation set to:

"Create new QoS flow description" for which the QoS flow identifier is not associated with the QoS flow identifier of the default QoS rule, "Modify existing QoS flow description" for which the QoS flow identifier is not associated with the QoS flow identifier of the default QoS rule.

Alternatively, in an embodiment, the UE for each QoS flow description with a QFI that is associated with the non-default QoS rule, the UE may check if the operation is different from "Delete existing QoS flow description". If so, the UE may determine that the QoS flow description is erroneous and proceed as described herein. Note that this is just another way to achieve the check that is proposed above.

If the above occurs, the UE may, after the completion of the current PDU session modification procedure, send a PDU Session Modification Request message to delete each QoS flow description that has a QFI (QoS Flow Identifier) which is not the same as the QFI of the default QoS rule.

Alternatively, the UE does not diagnose an error and shall locally delete each QoS flow description that has a QFI which is not the same as the QFI of the default QoS rule.

Alternatively, the UE shall initiate the PDU session release procedure by sending the PDU Session Release Request message.

Alternatively, the UE shall reject the PDU session modification procedure (i.e. the UE rejects PDU Session Modification Command message) by sending the PDU Session Modification Command Reject message.

In an embodiment, the UE may check if there is at least one mapped EPS(evolved packet system) bearer operation (in the Mapped EPS bearer contexts IE if received) with the operation code set to:

"Create new EPS bearer" and the associated QoS flow identifier (QFI) corresponds to a QoS rule that is not the default QoS rule, "Modify existing EPS bearer" and the associated QoS flow identifier (QFI) corresponds to a QoS rule that is not the default QoS rule.

Alternatively, in an embodiment, the UE for each Mapped EPS bearer context with a QFI that is associated with the non-default QoS rule, the UE may check if the operation is different from "Delete existing EPS bearer". If so, the UE may determine that the Mapped EPS bearer context is erroneous and proceed as described herein. Note that this is just another way to achieve the check that is proposed above.

If the above occurs, the UE shall, after the completion of the current PDU session modification procedure, send a PDU Session Modification Request message to delete each mapped EPS bearer context with a QFI that is not the same as the QFI of the default QoS rule.

Alternatively, the UE does not diagnose an error and shall locally delete each mapped EPS bearer context with a QFI that is not the same as the QFI of the default QoS rule.

Alternatively, the UE shall initiate the PDU session release procedure by sending the PDU Session Release Request message.

Alternatively, the UE shall reject the PDU session modification procedure (i.e. the UE rejects PDU Session Modification Command message) by sending the PDU Session Modification Command Reject message.

In the examples described above, the UE may detect a few errors as described above. The UE may still take one action in this case as proposed above.

In certain examples, when sending a PDU Session Modification Request message (e.g. to delete at least one QoS rule, or at least one QoS flow description, or at least one Mapped EPS bearer context), or when sending a PDU Session Release Request message, the UE can include any existing 5GSM cause (e.g. #83 "semantic error in the QoS operation") in the 5GSM message. Alternatively, the UE shall use a new 5GSM cause set for each of the errors defined above, or a new 5GSM cause that can be generic and would apply to all of the cases listed above. As an example, the UE can use a new 5GSM cause set to "Operation not allowed due to UE in NB-N1 mode".

The skilled person will appreciate that the examples above may also be applied when the UE is in EPS (i.e. in S1 mode) and the PDN connection is transferable to N1 mode. As such, the UE should check for the same errors when the UE in NB-IoT in S1 mode receives any of the existing ESM messages, for example that are defined in TS 3GPP 24.301 [4]. For example, the UE should check for the same errors listed above in the QoS rules that are received in the Protocol configuration options IE or Extended protocol configuration options IE in the MODIFY EPS BEARER CONTEXT REQUEST message (where the latter is the ESM NAS message that is received in S1 mode). Similarly, an existing 5GSM cause can be used when sending an ESM message by the UE (e.g. the MODIFY EPS BEARER CONTEXT ACCEPT message) to report an error, for example as described in section 6.1.4.1 of [2].

Accordingly, the skilled person will appreciate that all the examples above may be applied when the UE is in either N1 mode or S1 mode.

Solution Option 2

In certain examples, the QoS parameters (i.e. QoS rules, QoS flow descriptions, or Mapped EPS bearer contexts) that are not the default QoS rule, or are not associated with the default QoS rule, will be locally saved at the UE and the SMF when the UE enters NB-IoT (or when the UE is operating in NB-N1 mode). As the UE may support other RATs, such as WB-EUTRA or NR, then upon mobility from NB-IoT to another RAT the restriction about having only a default QoS rule will be lifted and the UE can then have QoS rules that are not a default QoS rule and can also have other associated QoS parameters (e.g. QoS flow descriptions or Mapped EPS bearer contexts).

As such, in certain examples of the present disclosure, when the UE enters NB-IoT, the UE should locally save a copy of all the non-default QoS parameters (i.e. each QoS rule that is not a default QoS rule and any associated QoS flow description or Mapped EPS bearer context). The UE in NB-IoT will then only use the default QoS rule and any other associated QoS parameter (e.g. QoS flow description or Mapped EPS bearer context).

Herein, the term "QoS parameters" may refer to any suitable parameters, for example QoS rules, QoS flow descriptions, or Mapped EPS bearer contexts in the examples below.

In certain examples, to save the QoS parameters, the UE may save a QoS parameter context and a corresponding QoS parameter context ID. For example, the QoS parameter context and a corresponding QoS parameter context ID may be in the following form.

In an embodiment, the form may include a list of QoS rule identifier for each QoS rule.

For each QoS rule, an associated QoS flow description (where the association between the QoS rule and the QoS flow description is based on a QFI) may be indicated.

For each QoS rule, an associated Mapped EPS bearer context (where the association between the Mapped EPS bearer context and the QoS flow description may be based on a QFI and optionally an EPS bearer identity (ID)) may be indicated.

In certain examples, the Mapped EPS bearer context may be represented in the form of an EPS bearer ID and all the other EPS related QoS parameters (e.g. TFT, packet filters, etc, for example as defined in [2] and [4]).

In an embodiment, QoS parameter context ID corresponding to each QoS rule identifier may be indicated.

In certain examples, the QoS parameter context ID may be part of the saved QoS parameter context.

In certain examples, the QoS parameter context may be saved per PDU session.

Similarly, the SMF may apply similar behavior as described above, noting that the SMF becomes aware of the UE's mobility into NB-IoT based on an indication from the AMF.

In certain examples, the UE that supports saving locally of the QoS parameters as described above may indicate this support either in the 5GMM capability IE or the 5GSM capability IE. For example, a new bit position in these IEs may be used for this purpose, e.g. "Saving of QoS parameters locally is supported" can be used, or any other suitable definition can be used for this purpose.

Similarly, in certain examples the network (e.g. AMF or SMF) may indicate if this is also supported in the network. For example, the AMF can indicate if this is supported by defining a similar bit in the 5GS network feature support IE (defined in [2]) that indicates that the network supports and allows the use of this feature. Alternatively, the SMF can indicate that it supports and allows the use of this feature by defining and using a similar bit in the 5GSM network feature support IE (defined in [2]). The network may indicate whether this is allowed for a UE based on the UE's capability and optionally the subscription information or local policies in the network.

In certain examples, the UE may operate in the manner described above if the network indicates that saving QoS parameters locally is allowed or the UE operates in this manner by default whenever the UE enters NB-IoT.

Although the QoS parameters are saved locally, certain examples of the present disclosure may define a new QoS operation that indicates the saving of QoS parameters as described above. The operation may be called, as an example, "Save existing QoS rule".

In certain examples, the SMF may send a PDU Session Modification Command message to the UE after the SMF receives an indication that the UE has entered NB-IoT. The SMF may transmit the PDU Session Modification Command message to inform the UE to save its QoS parameters. To do so, the SMF may set the QoS operation code to "Save existing QoS rule" for each of the QoS rule identifier. In certain examples, a similar operation may be defined for the QoS flow descriptions and the Mapped EPS bearer context. Alternatively, by indicating a specific QoS rule to be saved, the SMF and UE may also save all corresponding QoS parameters.

The use of this operation can also implicitly lead to the UE and SMF to use the default QoS rule only and its corresponding QoS parameters. Hence, when this new operation is used, the recipient saves all the QoS parameters that are currently available for the PDU session and then continues to use the default QoS rule and its corresponding QoS parameters as long as the UE is in NB-IoT.

Therefore, for example, when the UE enters NB-IoT, the SMF may send a PDU Session Modification Command message to the UE and set the operation code to "Save existing QoS rule" for each of the QoS rule identifier that should be saved. The UE and SMF both may save all the QoS parameters accordingly that correspond to each QoS rule identifier for which this operation is used. The UE may then send the PDU Session Modification Complete message. Optionally, the UE may acknowledge the saving of the QoS parameters locally by including the QoS rule IE and setting the operation code to "Save existing QoS rule" for each of the QoS rule identifier for each of the QoS rule that has been saved (and optionally the corresponding QoS parameters that are associated with that QoS rule).

Alternatively, a new IE with a list of QoS rule identifier can be used by either the UE or the SMF and the UE or the SMF may include it in a 5GSM message to indicate the list of QoS rule identifiers that have been or should be locally saved.

Alternatively, the UE may be the entity that sends the PDU Session Modification Request message and sets the operation code to "Save existing QoS rule" for each of the QoS rule identifier that is saved. The UE may do so after moving into NB-IoT. The network can then respond with the PDU Session Modification Command message as proposed above.

In certain examples, when the UE moves out of NB-IoT, the UE may autonomously resume using all saved QoS parameters. The SMF may also do the same after being notified that the UE has moved out of NB-IoT (e.g. into WB-EUTRA or NR).

In certain examples of the present disclosure, the above techniques may also be achieved by defining a new IE instead of using the QoS rules IE. For example, a new Saved QoS parameter context IE may be defined to list the QoS parameters that have been, or should be, saved. In certain examples, the IE may contain any combination of the current QoS parameters that are listed above or that are defined in [2].

In an embodiment, handling of QoS rules at the Establishment of a new PDU Session in N1 mode or PDN Connection in S1 mode is provided.

As indicated above, the UE in NB-IoT can only have, for each PDU session, a default QoS rule only. As such, no other non-QoS rules can exist. However, as errors can occur, the UE should check that this does not happen.

Therefore, in certain examples of the present disclosure, when the UE in NB-IoT receives a PDU Session Establishment Accept message, the UE should check for the following:

In an embodiment, the UE should check if the QoS rules received contain the operation set to "Create new QoS rule", and optionally the DQR bit is not set to "the QoS rule is not the default QoS rule" (i.e. there is an operation to create a new QoS rule that is not a default QoS rule).

If the above occurs, the UE shall, after the completion of the current PDU session establishment procedure, send a PDU Session Modification Request message to delete each of the QoS rule that is not the default QoS rule.

Alternatively, the UE does not diagnose an error and shall locally delete each QoS rule which is not a default QoS rule. That is, the UE locally deletes any rule that is not a default QoS rule, and does not report an error to the network.

Alternatively, the UE shall initiate the PDU session release procedure by sending the PDU Session Release Request message. For example, the UE may use an existing 5GSM cause or a new 5GSM cause as described herein.

The UE should check if the flow description operation (in the QoS flow descriptions IE) is set to "Create new QoS flow description", the request type is "initial request", and the QFI of the QoS flow description is not the same as the QFI that is associated with default QoS rule.

If the above occurs, the UE shall, after the completion of the current PDU session establishment procedure, send a PDU Session Modification Request message to delete each QoS flow description that has a QFI which is not the same as the QFI of the default QoS rule.

Alternatively, the UE does not diagnose an error and shall locally delete each QoS flow description that has a QFI which is not the same as (or is not associated with) the QFI of the default QoS rule. That is, the UE locally deletes all other additional QoS flow descriptions that have a QFI which is not the same as the QFI of the default QoS rule. A QoS flow description is associated with a QoS rule by the QFI. Since only a default QoS rule is allowed for each PDU session when the UE is in NB-IoT, then if the QoS flow description has a QFI which is not the same as the QFI of the default QoS rule the UE should not keep it. Examples of the present disclosure locally delete such QoS flow description.

Alternatively, the UE shall initiate the PDU session release procedure by sending the PDU Session Release Request message. For example, the UE may use an existing 5GSM cause or a new 5GSM cause as described herein.

The UE should check if there is at least one mapped EPS bearer operation (in the Mapped EPS bearer contexts IE if received) with the operation code set to:

"Create new EPS bearer" and the associated QFI corresponds to a QoS rule that is not the default QoS rule, "Modify existing EPS bearer" and the associated QFI corresponds to a QoS rule that is not the default QoS rule.

If the above occurs, the UE shall, optionally after the completion of the current 5GSM procedure, send a PDU Session Modification Request message to delete each mapped EPS bearer context with a QFI that is not the same as the QFI of the default QoS rule.

Alternatively, the UE does not diagnose an error and shall locally delete each mapped EPS bearer context with a QFI that is not the same as (or is not associated with) the QFI of the default QoS rule. That is, the UE locally deletes each mapped EPS bearer context with a QFI that is not the same as (or is not associated with) the QFI of the default QoS rule, and does not report an error to the network.

Alternatively, the UE shall initiate the PDU session release procedure by sending the PDU Session Release Request message. For example, the UE may use an existing 5GSM cause or a new 5GSM cause as described herein.

The above examples may also be applied when the UE is in S1 mode for which the UE is proposed to verify the same or equivalent or corresponding errors on TFTs, QoS rules and QoS flow descriptions during any ESM procedure.

Summary of Certain Examples of the Present Disclosure

The UE should preferably not send information that is related to an unsupported feature. Sending such information is not only useless for the network but is also inefficient as it will unnecessarily increase the message size and potentially increase power consumption when the UE is in low coverage areas. As described above, certain examples of the present disclosure provide techniques to avoid sending information that does not apply to the sending UE.

Furthermore, the UE in NB-IoT may receive different QoS rule operations, or QoS flow description operations, or mapped EPS bearer context operations to create or modify existing rules, flow descriptions, or mapped EPS bearer contexts, respectively, where the QFI of these parameters are not associated with the default QoS rule. Such parameters are not allowed to exist for a UE in NB-IoT (since only the default QoS rule can be available for the UE's PDU session) and there are currently no means to check for such errors and recover from them. On the other hand, certain examples of the present disclosure provide techniques to recover from such QoS errors.

In accordance with an example of the present disclosure, there is provided a method, for a UE, for establishing a data session, the method comprising: determining whether to provide an indication of a maximum data rate for the data session; if it is determined to provide the indication, transmitting, to a network entity, a data session establishment request including the indication; and if it is determined not to provide the indication, transmitting, to the network entity, a data session establishment request not including the indication.

In accordance with another example of the present disclosure, there is provided a method, for a UE, for establishing a data session, the method comprising: determining whether the UE supports transfer of data over the user plane; if the UE supports transfer of data over the user plane, transmitting, to a network entity, a data session establishment request including an indication of a maximum data rate for the data session; and if the UE does not support transfer of data over the user plane, transmitting, to the network entity, a data session establishment request including a value (e.g. predetermined value) indicating that the UE does not support transfer of data over the user plane.

In accordance with another example of the present disclosure, there is provided a method, for a network entity, for establishing a data session, the method comprising: receiving a data session establishment request; determining whether the data session establishment request includes a value (e.g. predetermined value) indicating that a UE does not support transfer of data over the user plane, or whether an indication of a maximum data rate for the data session is included in the data session establishment request: if the data session establishment request includes the value or does not include an indication of a maximum data rate, determining that the UE does not support user plane integrity protection and setting an integrity protection requirement as not needed for the UE.

In accordance with another example of the present disclosure, there is provided a method, for a UE and/or a first network entity (e.g. an SMF entity), for managing a data session in a network, wherein the data session is established for the UE and is associated with one or more QoS rules including a default QoS rule, the method comprising: in response to mobility of the UE from a first RAT into a second RAT (e.g. NB-IoT RAT), deleting, at the UE and/or the first network entity, all QoS rules except for the default QoS rule.

In accordance with another example of the present disclosure, there is provided a method, for a UE, for managing a data session in a network, wherein the data session is established for the UE and is associated with one or more QoS rules including a default QoS rule, the method comprising: in response to receiving a data session modification command from a network entity (e.g. an SMF entity) while the UE is in a second RAT (e.g. NB-IoT RAT), determining whether a condition, based on one or more QoS parameters (e.g. one or more of QoS rules, QoS flow descriptions, and mapped EPS bearer contexts) associated with the data session modification command, is satisfied.

In accordance with another example of the present disclosure, there is provided a method, for a UE and/or a first network entity (e.g. an SMF entity), for managing a data session in a network, wherein the data session is established for the UE and is associated with one or more QoS rules including a default QoS rule, the method comprising: in response to mobility of the UE from a first RAT into a second RAT (e.g. NB-IoT RAT), or in response to receiving a data session modification message including a predetermined indication, saving, by the UE and/or the first network entity, one or more QoS parameters (e.g. one or more of QoS rules, QoS flow descriptions, and mapped EPS bearer contexts) associated with the data session.

In accordance with another example of the present disclosure, there is provided a method, for a UE, for managing a data session in a network, wherein the data session is established for the UE and is associated with one or more QoS rules including a default QoS rule, the method comprising: in response to receiving a data session establishment accept message from a network entity (e.g. an SMF entity) while the UE is in a second RAT (e.g. NB-IoT RAT), determining whether a condition, based on one or more QoS parameters (e.g. one or more of QoS rules, QoS flow descriptions, and mapped EPS bearer contexts) associated with the data session establishment accept message, is satisfied.

Figure 2:
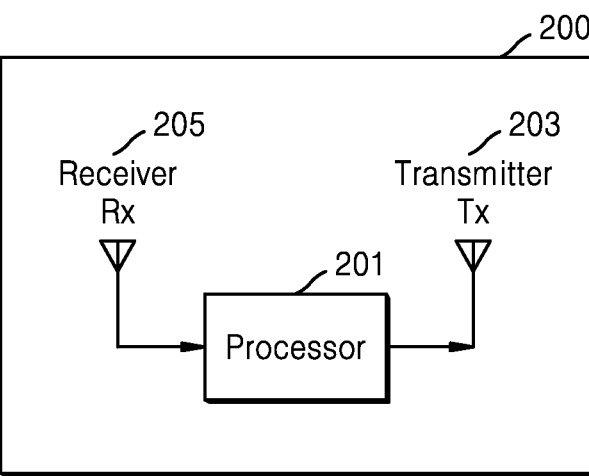
FIG. 2 is a block diagram of an exemplary network entity that may be used in certain examples of the present disclosure.

FIG. 2 is a block diagram of an exemplary network entity or UE that may be used in examples of the present disclosure. The skilled person will appreciate that a network entity may be implemented, for example, as a network element on a dedicated hardware, as a software instance running on a dedicated hardware, and/or as a virtualized function instantiated on an appropriate platform, e.g. on a cloud infrastructure.

The entity or UE 200 comprises a processor (or controller) 201, a transmitter 203 and a receiver 205. The receiver 205 is configured for receiving one or more messages from one or more other network entities, for example as described above. The transmitter 203 is configured for transmitting one or more messages to one or more other network entities, for example as described above. The processor 201 is configured for performing one or more operations, for example according to the operations as described above.

The techniques described herein may be implemented using any suitably configured apparatus and/or system. Such an apparatus and/or system may be configured to perform a method according to any aspect, embodiment, example or claim disclosed herein. Such an apparatus may comprise one or more elements, for example one or more of receivers, transmitters, transceivers, processors, controllers, modules, units, and the like, each element configured to perform one or more corresponding processes, operations and/or method steps for implementing the techniques described herein. For example, an operation/function of X may be performed by a module configured to perform X (or an X-module). The one or more elements may be implemented in the form of hardware, software, or any combination of hardware and software.

It will be appreciated that examples of the present disclosure may be implemented in the form of hardware, software or any combination of hardware and software. Any such software may be stored in the form of volatile or non-volatile storage, for example a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like.

It will be appreciated that the storage devices and storage media are embodiments of machine-readable storage that are suitable for storing a program or programs comprising instructions that, when executed, implement certain examples of the present disclosure. Accordingly, certain examples provide a program comprising code for implementing a method, apparatus or system according to any example, embodiment, aspect and/or claim disclosed herein, and/or a machine-readable storage storing such a program. Still further, such programs may be conveyed electronically via any medium, for example a communication signal carried over a wired or wireless connection.

Figure 3:
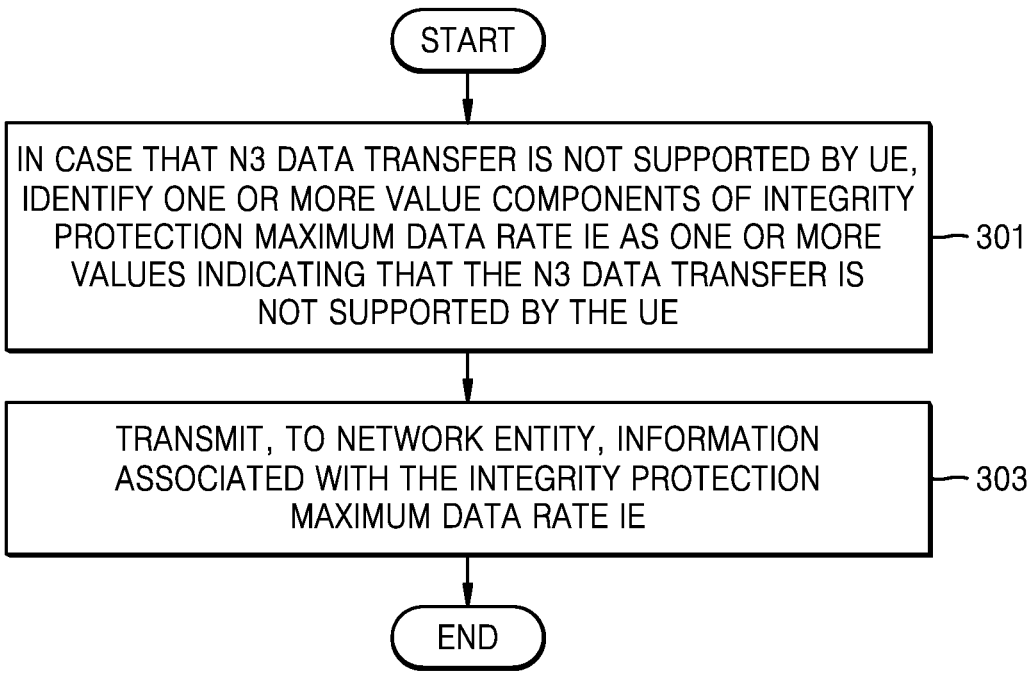
FIG. 3 is a flow chart of a method performed by a user equipment according to an embodiment of the disclosure.

FIG. 3 is a flow chart of a method performed by a user equipment according to an embodiment of the disclosure.

In step 301, in case that N3 data transfer is not supported by the UE, the UE may identify one or more values of an integrity protection maximum data rate information element (IE) as one or more values indicating that the N3 data transfer is not supported by the UE. As described above, the N3 data transfer may refer to a support of data transfer over a user plane. For example, the UE may be in a narrow band (NB)-N1 mode.

For example, the integrity protection maximum data rate information element may comprise: a first user plane integrity protection maximum data rate for an uplink; and a second user plane integrity protection maximum data rate for a downlink.

The UE may identify one or more first values of the first user plane integrity protection maximum data rate as one or more values indicating that user-plane integrity protection for the uplink is not supported by the UE. For example, the one or more first values indicating that the user-plane integrity protection for the uplink is not supported may be one or more null values.

The UE may identify one or more second values of the second user plane integrity protection maximum data rate as one or more values indicating that user-plane integrity protection for the downlink is not supported by the UE. For example, the one or more second values indicating that the user-plane integrity protection for the downlink is not supported may be one or more null values.

In step 303, the UE may transmit, to a network entity, information associated with the integrity protection maximum data rate IE. For example, the UE may transmit, to the network entity, the information associated with the integrity protection maximum data rate IE via a data session establishment request for indicating the network entity that the UE does not support the N3 data transfer.

FIG. 4 is a flow chart of a method performed by a user equipment according to another embodiment of the disclosure.

In step 401, the UE may receive, from a network entity, information associated with one or more quality of service (QoS) rules. For example, the information associated with the one or more QoS rules may be transferred via at least one of a PDU session modification command or a PDU session establishment accept message. Specifically, the UE may be in a narrow band (NB)-N1 mode.

In step 402, the UE may check the information associated with the one or more QoS rules, for a QoS rule associated with a non-default QoS rule and for the QoS rule with a rule operation different from deleting the QoS rule.

In step 403, in case that the UE is in NB-N1 mode, the QoS rule is associated with the non-default QoS rule and a rule operation corresponding to the QoS rule associated with the non-default QoS rule is different from deleting the QoS rule, the UE may detect the QoS rule as an error. For example, in case that the information associated with the one or more QoS rules is transferred via the PDU session establishment accept message, the rule operation corresponding to the QoS rule may indicate the UE to create the QoS rule, which is the non-default QoS rule. For example, a default QoS Rule indicator (DQR) bit of the QoS rule may indicate that the QoS rule is the non-default QoS rule.

In step 405, the UE may transmit, to the network entity, a protocol data unit (PDU) session modification request message to delete the detected QoS rule. For example, the PDU session modification request message may comprise information associated with a sematic error in a QoS operation for deleting the detected QoS rule. For example, in case that the information associated with the one or more QoS rules is transferred via the PDU session modification command, the UE may transmit, to the network entity, the PDU session modification request message after transmitting a PDU session modification complete message corresponding to the PDU session modification command.

FIG. 5 is a flow chart of a method performed by a user equipment according to another embodiment of the disclosure.

In step 501, the UE may receive, from a network entity, information associated with one or more quality of service (QoS) flow descriptions. For example, the information associated with the one or more QoS flow descriptions may be transferred via at least one of a PDU session modification command or a PDU session establishment accept message. Specifically, the UE may be in a narrow band (NB)-N1 mode.

In step 502, the UE may check the information associated with the one or more QoS flow descriptions, for a QoS flow description associated with a non-default QoS rule and for the QoS flow description with a rule operation different from deleting the QoS flow description.

In step 503, in case that the UE is in the NB-N1 mode, a QoS flow ID (QFI) of the QoS flow description is associated with the non-default QoS rule and a rule operation corresponding to the QoS flow description is different from deleting the QoS flow description associated with the non-default QoS rule, the UE may detect the QoS flow description as an error. For example, in case that the information associated with the one or more QoS flow descriptions is transferred via the PDU session establishment accept message, the rule operation may indicate to create the QoS flow description with the QFI associated with the non-default QoS rule. For example, in case that the information associated with the one or more QoS flow descriptions is transferred via the PDU session establishment accept message, a request type of a PDU session associated with the PDU session establishment accept message may be set to an initial request.

In step 505, the UE may transmit, to the network entity, a protocol data unit (PDU) session modification request message to delete the detected QoS flow description. For example, the PDU session modification request message may comprise information associated with a sematic error in a QoS operation for deleting the detected QoS flow description. For example, in case that the information associated with the one or more QoS flow descriptions is transferred via the PDU session modification command, the UE may transmit, to the network entity, the PDU session modification request message after transmitting a PDU session modification complete message corresponding to the PDU session modification command.

FIG. 6 is a diagram illustrating a user equipment according to an embodiment of the disclosure;

Referring to the FIG. 6, the UE 600 may include a processor 610, a transceiver 620 and a memory 630. However, all of the illustrated components are not essential. The UE 600 may be implemented by more or less components than those illustrated in the FIG. 6. In addition, the processor 610 and the transceiver 620 and the memory 630 may be implemented as a single chip according to another embodiment.

The aforementioned components will now be described in detail.

The processor 610 may include one or more processors or other processing devices that control the proposed function, process, and/or method. Operation of the UE 600 may be implemented by the processor 610.

The transceiver 620 may be connected to the processor 610 and transmit and/or receive a signal. In addition, the transceiver 620 may receive the signal through a wireless channel and output the signal to the processor 610. The transceiver 620 may transmit the signal output from the processor 610 through the wireless channel.

The memory 630 may store the control information or the data included in a signal obtained by the UE 600. The memory 630 may be connected to the processor 310 and store at least one instruction or a protocol or a parameter for the proposed function, process, and/or method. The memory 630 may include read-only memory (ROM) and/or random access memory (RAM) and/or hard disk and/or CD-ROM and/or DVD and/or other storage devices.

According to an embodiment of the disclosure, in case that N3 data transfer is not supported by the UE, the processor 610 is configured to: identify one or more values of an integrity protection maximum data rate information element as one or more values indicating that the N3 data transfer is not supported by the UE; and transmit, to a network entity via the transceiver 620, information associated with the integrity protection maximum data rate information element.

In an embodiment, the integrity protection maximum data rate information element may comprise: a first user plane integrity protection maximum data rate for an uplink; and a second user plane integrity protection maximum data rate for a downlink.

In an embodiment, the processor 610 is further configured to identify one or more first values of the first user plane integrity protection maximum data rate as one or more values indicating that user-plane integrity protection for the uplink is not supported by the UE.

In an embodiment, the processor 610 is further configured to determine one or more second values of the second user plane integrity protection maximum data rate as one or more values indicating that user-plane integrity protection for the downlink is not supported by the UE.

According to another embodiment of the disclosure, the processor 610 is configured to: receive, from a network entity via the transceiver 620, information associated with one or more quality of service (QoS) rules; check the information associated with the one or more QoS rules, for a QoS rule associated with a non-default QoS rule and for the QoS rule with a rule operation different from deleting the QoS rule; in case that the UE 600 is in a narrow band (NB)-N1 mode, the QoS rule is associated with the non-default QoS rule and the rule operation is different from deleting the QoS rule, detect the QoS rule as an error; and transmit, to the network entity via the transceiver 620, a protocol data unit (PDU) session modification request message to delete the detected QoS rule.

In an embodiment, the information associated with the one or more QoS rules may be transferred via a PDU session modification command In an embodiment, the information associated with the one or more QoS rules may be transferred via a PDU session establishment accept message.

In an embodiment, in case that the information associated with the one or more QoS rules is transferred via the PDU session establishment accept message.

In an embodiment, the rule operation may indicate to create the QoS rule associated with the non-default QoS rule.

In an embodiment, a default QoS Rule indicator (DQR) bit of the QoS rule indicates that the QoS rule may be the non-default QoS rule.

In an embodiment, the PDU session modification request message may comprise information associated with a sematic error in a QoS operation.

In an embodiment, the processor 610 is further configured to transmit, to the network entity via the transceiver 620, the PDU session modification request message after transmitting a PDU session modification complete message corresponding to the PDU session modification command.

According to another embodiment of the disclosure, the processor 610 is configured to: receive, from a network entity via the transceiver 620, information associated with one or more quality of service (QoS) flow descriptions; check the information associated with the one or more QoS flow descriptions, for a QoS flow description associated with a non-default QoS rule and for the QoS flow description with a rule operation different from deleting the QoS flow description; in case that the UE is in a narrow band (NB)-N1 mode, a QoS flow ID (QFI) of the QoS flow description is associated with the non-default QoS rule and the rule operation is different from deleting the QoS flow description, detect the QoS flow description as an error; and transmit, to the network entity via the transceiver 620, a protocol data unit (PDU) session modification request message to delete the detected QoS flow description.

In an embodiment, the information associated with the one or more QoS flow descriptions is transferred via a PDU session modification command.

In an embodiment, the information associated with the one or more QoS flow descriptions is transferred via a PDU session establishment accept message.

In an embodiment, in case that the information associated with the one or more QoS flow descriptions is transferred via the PDU session establishment accept message, the rule operation corresponding to the QoS flow description may indicate to create the QoS flow description associated with the non-default QoS flow description.

In an embodiment, a request type of a PDU session associated with the PDU session establishment accept message may be set to an initial request.

In an embodiment, the PDU session modification request message may comprise information associated with a sematic error in a QoS operation.

In an embodiment, the processor 610 is further configured to transmit, to the network entity via the transceiver 620, the PDU session modification request message after transmitting a PDU session modification complete message corresponding to the PDU session modification command.

FIG. 7 is a diagram illustrating a core network entity according to embodiments of the present disclosure.

The network entity described above may correspond to the core network entity 700.

Referring to the FIG. 7, the core network entity 700 may include a processor 710, a transceiver 720 and a memory 730. However, all of the illustrated components are not essential. The core network entity 700 may be implemented by more or less components than those illustrated in FIG. 7. In addition, the processor 710 and the transceiver 720 and the memory 730 may be implemented as a single chip according to another embodiment.

The aforementioned components will now be described in detail.

The transceiver 720 may provide an interface for performing communication with other devices in a network. That is, the transceiver 720 may convert a bitstream transmitted from the core network entity 700 to other devices to a physical signal and covert a physical signal received from other devices to a bitstream. That is, the transceiver 720 may transmit and receive a signal. The transceiver 720 may be referred to as modem, transmitter, receiver, communication unit and communication module. The transceiver 720 may enable the core network entity 700 to communicate with other devices or system through backhaul connection or other connection method.

The memory 730 may store a basic program, an application program, configuration information for an operation of the core network entity 700. The memory 430 may include volatile memory, non-volatile memory and a combination of the volatile memory and the non-volatile memory. The memory 730 may provide data according to a request from the processor 710.

The processor 710 may control overall operations of the core network entity 400. For example, the processor 710 may transmit and receive a signal through the transceiver 720. The processor 710 may include at least one processor. The processor 710 may control the core network entity 400 to perform operations according to embodiments of the present disclosure.

The processor 710 is configured to: in case that N3 data transfer is not supported by a UE, receive, from the UE via the transceiver 720, information associated with the integrity protection maximum data rate information element, wherein one or more value components of the integrity protection maximum data rate information element include one or more values indicating that the N3 data transfer is not supported by the UE, wherein the UE is in a narrow band(NB)-N1 mode.

The processor 710 is configured to: transmit, to a UE in a NB-N1 mode via the transceiver 720, information associated with one or more quality of service (QoS) rules; and receive, from the UE via the transceiver 720, a protocol data unit (PDU) session modification request message to delete a QoS rule detected by the UE, wherein in case that the QoS rule, among the one or more QoS rules, is associated with a non-default QoS rule and a rule operation corresponding to the QoS rule is different from deleting the QoS rule, the QoS rule is detected as an error.

The processor 710 is configured to: transmit, to a UE in a NB-N1 mode via the transceiver 720, information associated with one or more quality of service (QoS) flow descriptions; and receive from the UE via the transceiver 720, a protocol data unit (PDU) session modification request message to delete a QoS flow description detected by the UE, wherein in case that a QoS flow ID (QFI) of the QoS flow description is associated with a non-default QoS rule and a rule operation corresponding to the QoS flow description is different from deleting the QoS flow description, the QoS flow description is detected as an error.

According to an embodiment of the disclosure, a method, for a UE, for establishing a data session may comprise: determining whether to provide an indication of a maximum data rate for the data session; if it is determined to provide the indication, transmitting, to a network entity, a data session establishment request including the indication; and if it is determined not to provide the indication, transmitting, to the network entity, a data session establishment request not including the indication.

In an embodiment, wherein the determining comprises: determining to provide the indication if the UE supports transfer of data over the user plane (e.g. for uplink and/or for downlink); and determining not to provide the indication if the UE does not support transfer of data over the user plane (e.g. for uplink and/or for downlink).

In an embodiment, wherein the determining comprises determining to provide the indication when in S1 mode, after the first inter-system change from S1 mode to N1 mode, the UE is operating in single-registration mode in the network supporting N26 interface, and if the UE supports data transfer over the user plane (i.e. the UE supports N3 data transfer).

In an embodiment, wherein the indication is of format "TLV", and wherein the indication comprises a data structure including: (i) a first portion (e.g. first octet) containing an identifier (e.g. an Integrity protection maximum data rate IEI), (ii) a second portion (e.g. second octet) containing a length of the indication (e.g. length of the integrity protection maximum data rate contents), (iii) a third portion (e.g. third octet) containing a maximum data rate per UE for uplink (e.g. maximum data rate per UE for user-plane integrity protection for uplink), and (iv) a fourth portion (e.g. fourth octet) containing a maximum data rate per UE for downlink (e.g. maximum data rate per UE for user-plane integrity protection for downlink).

In an embodiment, wherein transmitting the data session establishment request not including the indication comprises transmitting the data session establishment request including a value (e.g. predetermined value) indicating that the UE does not support transfer of data over the user plane.

According to an embodiment of the disclosure, a method, for a UE, for establishing a data session, may comprise: determining whether the UE supports transfer of data over the user plane; if the UE supports transfer of data over the user plane, transmitting, to a network entity, a data session establishment request including an indication of a maximum data rate for the data session; and if the UE does not support transfer of data over the user plane, transmitting, to the network entity, a data session establishment request including a value (e.g. predetermined value) indicating that the UE does not support transfer of data over the user plane.

In an embodiment, wherein: the data session is a PDU session, the indication comprises an Integrity protection maximum data rate IE, and the data session establishment request comprises a PDU Session Establishment Request message.

According to an embodiment of the disclosure, a method, for a network entity, for establishing a data session may comprise: receiving a data session establishment request; determining whether the data session establishment request includes a value (e.g. predetermined value) indicating that a UE does not support transfer of data over the user plane, or whether an indication of a maximum data rate for the data session is included in the data session establishment request; if the data session establishment request includes the value or does not include an indication of a maximum data rate, determining that the UE does not support user plane integrity protection.

In an embodiment, the method may further comprise: forwarding, to a second network entity, the data session establishment request; and transmitting, to the second network entity, an indication (e.g. control plane only indication) that the UE does not support transfer of data over the user plane, whereby the second network entity (i) determines that integrity protection for the user plane associated with the data session is not required based on the indication that the UE does not support transfer of data over the user plane, and (ii) sets an integrity protection requirement as not needed for the UE.

According to an embodiment of the disclosure, a method, for a UE and/or a first network entity (e.g. an SMF entity), for managing a data session in a network, wherein the data session is established for the UE and is associated with one or more QoS rules including a default QoS rule, the method may comprise: in response to mobility of the UE from a first RAT into a second RAT (e.g. NB-IoT RAT), deleting, at the UE and/or the first network entity, all QoS rules except for the default QoS rule.

In an embodiment, the method may further comprise setting a packet filter associated with the default QoS rule to match all filter for the uplink (and optionally for the downlink), whereby all traffic associated with the data session is mapped to the default QoS rule.

According to an embodiment of the disclosure, a method, for a UE, for managing a data session in a network, wherein the data session is established for the UE and is associated with one or more QoS rules including a default QoS rule, the method may comprise: in response to receiving a data session modification command from a network entity (e.g. an SMF entity) while the UE is in a second RAT (e.g. NB-IoT RAT), determining whether a condition, based on one or more QoS parameters (e.g. one or more of QoS rules, QoS flow descriptions, and mapped EPS bearer contexts) associated with the data session modification command, is satisfied.

In an embodiment, wherein the condition comprises: there is a QoS rule specified in the data session modification command with a rule operation set to: "create new QoS rule" (and optionally the QoS rule is not the default QoS rule); and/or "modify existing QoS rule" (and optionally the operation is on a non-default QoS rule).

In an embodiment, the method may further comprise one or more of: if the condition is satisfied, after completing data session modification according to the data session modification command, transmitting a data session modification request message to delete each QoS rule that is not the default QoS rule; if the condition is satisfied, deleting each QoS rule that is not a default QoS rule without reporting an error to the network; and if the condition is satisfied, optionally after completing data session modification according to the data session modification command, transmitting a data session release request message to initiate a data session release procedure.

In an embodiment, wherein the condition comprises: there is a QoS flow description specified in the data session modification command with a flow description operation set to: "create new QoS flow description" (and optionally the QoS flow identifier is not associated with the QoS flow identifier of the default QoS rule); and/or "modify existing QoS flow description" (and optionally the QoS flow identifier is not associated with the QoS flow identifier of the default QoS rule).

In an embodiment, the method may further comprise one or more of: if the condition is satisfied, after completing data session modification according to the data session modification command, transmitting a data session modification request message to delete each QoS flow description that has a QFI that is not the same as the QFI of the default QoS rule; if the condition is satisfied, deleting, at the UE, each QoS flow description that has a QFI that is not the same as the QFI of the default QoS rule, without reporting an error to the network; and if the condition is satisfied, transmitting a data session release request message to initiate a data session release procedure.

In an embodiment, wherein the condition comprises: there is at least one mapped EPS bearer operation with the operation code set to: "create new EPS bearer" (and optionally the associated QFI corresponds to a QoS rule that is not the default QoS rule); and/or "modify existing EPS bearer" (and optionally the associated QFI corresponds to a QoS rule that is not the default QoS rule).

In an embodiment, the method may further comprise one or more of: if the condition is satisfied, after completing data session modification according to the data session modification command, transmitting a data session modification request message to delete each mapped EPS bearer context with a QFI that is not the same as the QFI of the default QoS rule; if the condition is satisfied, deleting, at the UE, each mapped EPS bearer context with a QFI that is not the same as the QFI of the default QoS rule, without reporting an error to the network; and if the condition is satisfied, transmitting a data session release request message to initiate a data session release procedure.

In an embodiment, wherein the data session modification request message comprises information (e.g. generic or scenario-specific) indicating the reason for the data session modification request.

According to an embodiment of the disclosure, a method, for a UE and/or a first network entity (e.g. an SMF entity), for managing a data session in a network, wherein the data session is established for the UE and is associated with one or more QoS rules including a default QoS rule, the method may comprise: in response to mobility of the UE from a first RAT into a second RAT (e.g. NB-IoT RAT), or in response to receiving a data session modification message including a predetermined indication, saving, by the UE and/or the first network entity, one or more QoS parameters (e.g. one or more of QoS rules, QoS flow descriptions, and mapped EPS bearer contexts) associated with the data session.

In an embodiment, the method may further comprise using, for the data session, the default QoS rule and any QoS parameters associated with the default QoS rule.

In an embodiment, wherein saving the QoS parameters comprises saving (i) the default QoS rule and QoS parameters associated with the default QoS rule, and (ii) one or more QoS parameters that are not the default QoS rule or are not associated with the default QoS rule.

In an embodiment, wherein saving the QoS parameters comprises saving a QoS parameter context and a corresponding QoS parameter context ID.

In an embodiment, wherein saving the QoS parameters comprises saving a QoS parameter context per data session.

In an embodiment, wherein the QoS parameter context and the corresponding QoS parameter context ID comprises: a list of QoS rule identifiers for each QoS rule and: for each QoS rule, an associated QoS flow description; for each QoS rule, an associated Mapped EPS bearer context; and a QoS parameter context ID corresponding to each QoS rule identifier.

In an embodiment, the method may further comprise signalling, by the UE and/or the first network entity, support for saving QoS parameters.

In an embodiment, the method may further comprise in response to mobility of the UE from the second RAT into a RAT different from the second RAT, retrieving the saved QoS parameters, and using the retrieved QoS parameters for the data session.

According to an embodiment of the disclosure, a method, for a UE, for managing a data session in a network, wherein the data session is established for the UE and is associated with one or more QoS rules including a default QoS rule, the method may comprise: in response to receiving a data session establishment accept message from a network entity (e.g. an SMF entity) while the UE is in a second RAT (e.g. NB-IoT RAT), determining whether a condition, based on one or more QoS parameters (e.g. one or more of QoS rules, QoS flow descriptions, and mapped EPS bearer contexts) associated with the data session establishment accept message, is satisfied.

In an embodiment, wherein the condition comprises: there is a QoS rule specified in the data session establishment accept message with a rule operation set to "create new QoS rule" (and optionally the QoS rule is not the default QoS rule).

In an embodiment, the method may further comprise one or more of: if the condition is satisfied, after completing data session establishment, transmitting a data session modification request message to delete each QoS rule that is not the default QoS rule; if the condition is satisfied, deleting each QoS rule that is not the default QoS rule without reporting an error to the network; and if the condition is satisfied, transmitting a data session release request message to initiate a data session release procedure.

In an embodiment, wherein the condition comprises: (i) there is a QoS flow description specified in the data session establishment accept message with a flow description operation set to "create new QoS flow description", (ii) the request type is "initial request", and (iii) the QFI of the QoS flow description is not the same as the QFI associated with the default QoS rule.

In an embodiment, the method may further comprise one or more of: if the condition is satisfied, after completing data session establishment, transmitting a data session modification request message to delete each QoS flow description that has a QFI that is not the same as the QFI of the default QoS rule; if the condition is satisfied, deleting, at the UE, each QoS flow description that has a QFI that is not the same as the QFI of the default QoS rule, without reporting an error to the network: and if the condition is satisfied, transmitting a data session release request message to initiate a data session release procedure.

In an embodiment, wherein the condition comprises: there is at least one mapped EPS bearer operation with the operation code set to: "create new EPS bearer" (and optionally the associated QFI corresponds to a QoS rule that is not the default QoS rule); and/or "modify existing EPS bearer" (and optionally the associated QFI corresponds to a QoS rule that is not the default QoS rule).

In an embodiment, the method may further comprise one or more of: if the condition is satisfied, after completing data session establishment, transmitting a data session modification request message to delete each mapped EPS bearer context with a QFI that is not the same as the QFI of the default QoS rule; if the condition is satisfied, deleting, at the UE, each mapped EPS bearer context with a QFI that is not the same as the QFI of the default QoS rule, without reporting an error to the network; and if the condition is satisfied, transmitting a data session release request message to initiate a data session release procedure.

According to an embodiment of the disclosure, A UE or network entity configured to operate according to a method of any preceding claim is disclosed.

According to an embodiment of the disclosure, a network comprising a UE and/or a network entity is disclosed.

According to an embodiment of the disclosure, a computer program comprising instructions which, when the program is executed by a computer or processor, cause the computer or processor to carry out the method is disclosed.

According to an embodiment of the disclosure, a computer or processor-readable data carrier having stored thereon a computer program is disclosed.

According to an embodiment of the disclosure, a method performed by a user equipment (UE) in a wireless communication system is provided. The method may comprise: in case that N3 data transfer is not supported by the UE, identifying one or more values of an integrity protection maximum data rate information element as one or more values indicating that the N3 data transfer is not supported by the UE; and transmitting, to a network entity, information associated with the integrity protection maximum data rate information element.

In an embodiment, wherein the integrity protection maximum data rate information element may comprise: a first user plane integrity protection maximum data rate for an uplink; and a second user plane integrity protection maximum data rate for a downlink.

In an embodiment, wherein the identifying of the one or more value components of the integrity protection maximum data rate information element may comprise: identifying or more first values of the first user plane integrity protection maximum data rate as one or more values indicating that a user-plane integrity protection for the uplink is not supported by the UE.

In an embodiment, wherein the identifying of the one or more values of the integrity protection maximum data rate information element may comprise: identifying one or more second values of the second user plane integrity protection maximum data rate as one or more values indicating that user-plane integrity protection for the downlink is not supported by the UE.

According to an embodiment of the disclosure, a method performed by a user equipment (UE) in a wireless communication system is provided. The method may comprise: receiving, from a network entity, information associated with one or more quality of service (QoS) rules; checking the information associated with the one or more QoS rules, for a QoS rule associated with a non-default QoS rule and for the QoS rule with a rule operation different from deleting the QoS rule; in case that the UE is in a narrow band (NB)-N1 mode, the QoS rule is associated with the non-default QoS rule and the rule operation is different from deleting the QoS rule, detecting the QoS rule as an error; and transmitting, to the network entity, a protocol data unit (PDU) session modification request message to delete the detected QoS rule.

In an embodiment, wherein the information associated with the one or more QoS rules is transferred via a PDU session modification command.

In an embodiment, wherein the information associated with the one or more QoS rules is transferred via a PDU session establishment accept message.

In an embodiment, wherein the rule operation corresponding to the QoS rule may indicate to create the QoS rule associated with the non-default QoS rule.

In an embodiment, wherein the UE is in NB-N1 mode.

In an embodiment, wherein a default QoS Rule indicator (DQR) bit of the QoS rule indicates that the QoS rule is the non-default QoS rule.

In an embodiment, wherein the PDU session modification request message may comprise information associated with a sematic error in a QoS operation.

In an embodiment, wherein the transmitting of the PDU session modification request message may comprise: transmitting, to the network entity, the PDU session modification request message after transmitting a PDU session modification complete message corresponding to the PDU session modification command.

According to an embodiment of the disclosure, a method performed by a user equipment (UE) in a wireless communication system is provided. The method may comprise:

receiving, from a network entity, information associated with one or more quality of service, QoS, flow descriptions; checking the information associated with the one or more QoS flow descriptions, for a QoS flow description associated with a non-default QoS rule and for the QoS flow description with a rule operation different from deleting the QoS flow description; in case that the UE is in a narrow band (NB)-N1 mode, a QoS flow ID (QFI) of the QoS flow description is associated with the non-default QoS rule and the rule operation is different from deleting the QoS flow description, detecting the QoS flow description as an error; and transmitting, to the network entity, a protocol data unit (PDU) session modification request message to delete the detected QoS flow description.

In an embodiment, wherein the information associated with the one or more QoS flow descriptions is transferred via a PDU, session modification command.

In an embodiment, wherein the information associated with the one or more QoS flow descriptions is transferred via a PDU session establishment accept message.

In an embodiment, wherein the rule operation corresponding to the QoS flow description indicates to create the QoS flow description associated with the non-default QoS flow description.

In an embodiment, wherein the UE is in NB-N1 mode.

In an embodiment, wherein a request type of a PDU session associated with the PDU session establishment accept message is set to an initial request.

In an embodiment, wherein the PDU session modification request message comprises information associated with a sematic error in a QoS operation.

In an embodiment, wherein the transmitting of the PDU session modification request message comprises: transmitting, to the network entity, the PDU session modification request message after transmitting a PDU session modification complete message corresponding to the PDU session modification command.

According to an embodiment of the disclosure, a user equipment (UE) in a wireless communication is provided. The UE may comprise a transceiver and at least one processor configured to: in case that N3 data transfer is not supported by the UE, identify one or more values of an integrity protection maximum data rate information element as one or more values indicating that the N3 data transfer is not supported by the UE; and transmit, to a network entity via the transceiver, information associated with the integrity protection maximum data rate information element.

According to an embodiment of the disclosure, a user equipment (UE) in a wireless communication system is provided. The UE may comprise a transceiver and at least one processor configured to: receive, from a network entity via the transceiver, information associated with one or more quality of service (QoS) rules; check the information associated with the one or more QoS rules, for a QoS rule associated with a non-default QoS rule and for the QoS rule with a rule operation different from deleting the QoS rule; in case that the UE is in a narrow band (NB)-N1 mode, the QoS rule is associated with the non-default QoS rule and a rule operation is different from deleting the QoS rule, detect the QoS rule as an error; and transmit, to the network entity via the transceiver, a protocol data unit (PDU) session modification request message to delete the detected QoS rule.

According to an embodiment of the disclosure, a user equipment (UE) in a wireless communication system is provided. The UE may comprise a transceiver and at least one processor configured to: receive, from a network entity via the transceiver, information associated with one or more quality of service (QoS) flow descriptions; check the information associated with the one or more QoS flow descriptions, for a QoS flow description associated with a non-default QoS rule and for the QoS flow description with a rule operation different from deleting the QoS flow description; in case that the UE is in a narrow band (NB)-N1 mode, a QoS flow ID (QFI) of the QoS flow description is associated with the non-default QoS rule and a rule operation is different from deleting the QoS flow description, detect the QoS flow description as an error; and transmit, to the network entity via the transceiver, a protocol data unit (PDU) session modification request message to delete the detected QoS flow description, wherein the UE is in a narrow band (NB)-N1 mode.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a network entity in a wireless communication system, the method comprising:
transmitting, to a user equipment (UE), information associated with one or more quality of service (QOS) rules,
wherein the information associated with the one or more QoS rules indicates a rule operation corresponding to a QoS rule and whether the QoS rule is a default QOS rule, and
wherein in case that the UE is in a narrow band (NB)-N1 mode, the rule operation is different from deleting an existing QoS rule and the QoS rule is not the default QoS rule, the QoS rule is detected as an error; and
receiving, from the UE, a protocol data unit (PDU) session modification request message to delete the QoS rule.

2. The method of claim 1, wherein the information associated with the one or more QoS rules is transferred via a PDU session modification command.

3. The method of claim 1, wherein the information associated with the one or more QoS rules is transferred via a PDU session establishment accept message.

4. The method of claim 1, wherein the rule operation indicates to create new QoS rule.

5. The method of claim 1, wherein the information associated with the one or more QoS rules includes a default QOS Rule indicator (DQR) bit indicating whether the QoS rule is the default QoS rule.

6. The method of claim 1, wherein the PDU session modification request message comprises information associated with a sematic error in a QoS operation.

7. The method of claim 6, wherein the information associated with the sematic error is associated with a 5G session management (5GSM) cause #83.

8. A network entity in a wireless communication system, the network entity comprising:
a transceiver; and
at least one processor coupled with the transceiver and configured to:
transmit, to a user equipment (UE) via the transceiver, information associated with one or more quality of service (QOS) rules,
wherein the information associated with the one or more QoS rules indicates a rule operation corresponding to a QoS rule and whether the QoS rule is a default QOS rule, and
wherein in case that the UE is in a narrow band (NB)-N1 mode, the rule operation is different from deleting an existing QoS rule and the QoS rule is not the default QoS rule, the QOS rule is detected as an error; and
receive, from the UE via the transceiver, a protocol data unit (PDU) session modification request message to delete the QOS rule.

9. A user equipment (UE) in a wireless communication system, the UE comprising:
a transceiver; and
at least one processor coupled with the transceiver and configured to:
receive, from a network entity via the transceiver, information associated with one or more quality of service (QOS) rules;
check the information associated with the one or more QoS rules, for a QoS rule that is not a default QOS rule and for the QoS rule with a rule operation different from deleting an existing QoS rule;
in case that the UE is in a narrow band (NB)-N1 mode, the QoS rule is not the default QoS rule and the rule operation is different from deleting the existing QoS rule, detect the QoS rule as an error; and
transmit, to the network entity via the transceiver, a protocol data unit (PDU) session modification request message to delete the QOS rule.

10. A method performed by a user equipment (UE) in a wireless communication system, the method comprising:
receiving, from a network entity, information associated with one or more quality of service (QOS) flow descriptions;
checking the information associated with the one or more QoS flow descriptions, for a QoS flow description associated with a non-default QoS rule and for the QoS flow description with a flow description operation different from deleting the QoS flow description;
in case that the UE is in a narrow band (NB)-N1 mode, a QoS flow ID (QFI) of the QoS flow description is associated with the non-default QoS rule and the flow description operation is different from deleting the QoS flow description, detecting the QoS flow description as an error; and
transmitting, to the network entity, a protocol data unit (PDU) session modification request message to delete the detected QoS flow description.

11. A method performed by a network entity in a wireless communication system, the method comprising:
transmitting, to a user equipment (UE), information associated with one or more quality of service (QOS) flow descriptions,
wherein the information associated with the one or more QoS flow descriptions indicates a flow description operation corresponding to a QoS flow description and a QoS flow ID (QFI) of the QoS flow description, and
wherein in case that the UE is in a narrow band (NB)-N1 mode, the flow description operation is different from deleting an existing QoS flow description and the QFI is not the same as a QFI of a default QoS rule, the QoS flow description is detected as an error; and
receiving, from the UE, a protocol data unit (PDU) session modification request message to delete the QoS flow description.

12. The method of claim 11, wherein the information associated with the one or more QoS flow descriptions is transferred via a PDU session establishment accept message, and
wherein a request type of a PDU session associated with the PDU session establishment accept message is set to an initial request.

13. The method of claim 11, wherein the flow description operation indicates to create new QoS flow description.

14. The method of claim 11, wherein the PDU session modification request message comprises information associated with a sematic error in a QoS operation.

15. A user equipment (UE) in a wireless communication system, the UE comprising:

a transceiver; and at least one processor coupled with the transceiver and configured to:

receive, from a network entity via the transceiver, information associated with one or more quality of service (QOS) flow descriptions;

check the information associated with the one or more QoS flow descriptions, for a QoS flow description associated with a non-default QoS rule and for the QoS flow description with a flow description operation different from deleting the QoS flow description;

in case that the UE is in a narrow band (NB)-N1 mode, a QoS flow ID (QFI) of the QoS flow description is associated with the non-default QoS rule and the flow description operation is different from deleting the QoS flow description, detect the QoS flow description as an error; and transmit, to the network entity via the transceiver, a protocol data unit (PDU) session modification request message to delete the detected QoS flow description.

16. A network entity in a wireless communication system, the network entity comprising:

a transceiver; and at least one processor coupled with the transceiver and configured to:

transmit, to a user equipment (UE) via the transceiver, information associated with one or more quality of service (QOS) flow descriptions, wherein the information associated with the one or more QoS flow descriptions indicates a flow description operation corresponding to a QoS flow description and a QoS flow ID (QFI) of the QoS flow description, and wherein in case that the UE is in a narrow band (NB)-N1 mode, the flow description operation is different from deleting an existing QoS flow description and the QFI is not the same as a QFI of a default QoS rule, the QoS flow description is detected as an error; and receive, from the UE via the transceiver, a protocol data unit (PDU) session modification request message to delete the QoS flow description.

17. A method performed by a network entity in a wireless communication system, the method comprising:

receiving, from a user equipment (UE), information associated with an integrity protection maximum data rate information element, wherein in case that N3 data transfer is not supported by the UE, the integrity protection maximum data rate information element includes one or more values indicating that the N3 data transfer is not supported by the UE.

18. The method of claim 17, wherein the one or more values indicate that user-plane integrity protection for a downlink is not supported by the UE.

19. A network entity in a wireless communication system, the network entity comprising:

a transceiver; and at least one processor coupled with the transceiver and configured to:

receive, from a user equipment (UE) via the transceiver, information associated with an integrity protection maximum data rate information element, wherein in case that N3 data transfer is not supported by the UE, the integrity protection maximum data rate information element includes one or more values indicating that the N3 data transfer is not supported by the UE.

20. A user equipment (UE) in a wireless communication system, the UE comprising:

a transceiver; and at least one processor coupled with the transceiver and configured to:

in case that N3 data transfer is not supported by the UE, identify one or more values of an integrity protection maximum data rate information element as one or more values indicating that the N3 data transfer is not supported by the UE; and transmitting, to a network entity, information associated with the integrity protection maximum data rate information element.

* * * * *